US012810197B2

(12) United States Patent
Choudhary et al.

(10) Patent No.: US 12,810,197 B2
(45) Date of Patent: Nov. 24, 2026

(54) IDENTIFYING BOT ACTIVITY USING TOPOLOGY-AWARE TECHNIQUES

(71) Applicant: Adobe Inc., San Jose, CA (US)

(72) Inventors: Gautam Choudhary, Bangalore (IN); Sk Izajur Rahaman, West Bengal (IN); Siba Smarak Panigrahi, Bhubaneswar (IN); Prithvi Bhutani, Seattle, WA (US); Manoj Kilaru, San Diego, CA (US); Kanishk Singh, Rajasthan (IN); Iftikhar Ahamath Burhanuddin, Bangalore (IN); Aditi Singhania, Chhattisgarh (IN)

(73) Assignee: Adobe Inc., San Jose, CA (US)

( * ) Notice: Subject to any disclaimer, the term of this patent is extended or adjusted under 35 U.S.C. 154(b) by 1274 days.

(21) Appl. No.: 17/709,615

(22) Filed: Mar. 31, 2022

(65) Prior Publication Data

US 2023/0316124 A1 Oct. 5, 2023

(51) Int. Cl.
*H04L 29/06* (2006.01)
*G06F 21/31* (2013.01)
(Continued)

(52) U.S. Cl.
CPC ........... *G06N 20/00* (2019.01); *G06F 21/316* (2013.01); *G06F 21/554* (2013.01)

(58) Field of Classification Search
CPC ...... G06N 20/00; G06N 3/0895; G06N 20/10; G06N 3/08; G06F 21/316; G06F 21/554;
(Continued)

(56) References Cited

U.S. PATENT DOCUMENTS 10,326,789 B1 6/2019 Vines et al.
2016/0171068 A1* 6/2016 Hardin .................... G06F 16/27 707/610

(Continued)

OTHER PUBLICATIONS 2018-2019 Bot Baseline: Fraud in Digital Advertising, Available Online at: https://www.ana.net/miccontent/show/id/rr-2019-bot-baseline, Apr. 30, 2019, 38 pages.

(Continued)

*Primary Examiner* — Edward Zee
*Assistant Examiner* — Leynna Truvan
(74) *Attorney, Agent, or Firm* — Kilpatrick Townsend & Stockton LLP

(57) ABSTRACT

In some embodiments, techniques for identifying bot activity are provided. For example, a process may involve receiving a plurality of samples, wherein each sample is a record of click activity; classifying the plurality of samples among a first class and a second class, using a machine learning model trained by a training process, to produce a corresponding plurality of classification predictions; filtering click activity data, based on information from the plurality of classification predictions, to produce filtered click activity data; and causing a user interface of a computing environment to be modified based on information from the filtered click activity data. The training process includes training the machine learning model to classify samples among the first and second classes, using a training set of samples of the first class, a training set of samples of the second class, and values of a topological loss function calculated based on the training sets.

20 Claims, 13 Drawing Sheets
(3 of 13 Drawing Sheet(s) Filed in Color)

(51) Int. Cl.
*G06F 21/55* (2013.01)
*G06N 20/00* (2019.01)

(58) Field of Classification Search
CPC ............ G06F 11/3438; G06F 2221/00; G06F 16/285; G06F 16/35; G06F 16/45; G06F 16/55; G06F 16/65; G06F 16/75; G06F 16/906; G06F 18/24; G06F 2218/12; G06F 11/3048; G06F 17/2818; G06F 40/44; G06F 19/24; G06F 19/707; G06F 30/27; G06V 10/87; G06V 30/19113; G06V 30/36; G06V 30/19173; G06V 30/413; G06V 40/197; G06V 40/394; G06V 10/70; G06T 2207/20081; G06T 5/60; G06K 9/00087; G06K 9/00147; G06K 9/0042; G06K 9/00288; G06K 9/00536; G06K 9/00617; G06K 9/6267; G01N 15/0272; G03F 7/706841; G05D 2101/15; G06Q 40/03055; G06Q 40/03251; G06Q 40/0421; G06Q 40/0631; H04N 21/4665; H04N 21/4662; H04J 2203/0039; H04J 2203/0055; H04L 12/243; H04L 12/2807; H04L 45/02; H04L 47/829; H04L 67/1042; H04L 67/22; H04L 67/535; H04L 2012/5609; H04L 2012/6432; H04L 41/16; H04W 52/0251; H04W 52/0258
See application file for complete search history.

(56) References Cited

U.S. PATENT DOCUMENTS

2019/0124160 A1 4/2019 Dhamnani et al.
2023/0104757 A1* 4/2023 Pramod ................ G06N 3/0475
706/11

OTHER PUBLICATIONS

Adobe, DeviceAtlas, Available Online at: https://deviceatlas.com/case-studies/adobe, Accessed from Internet on Apr. 11, 2022, 3 pages.
Bot Detection, DeviseAtlas, Available Online at: https://deviceatlas.com/bot-detection, Accessed from Internet on Apr. 11, 2022, 5 pages.
Bot Detection & Mitigation, Imperva, Available Online at: https://www.imperva.com/products/bot-detection-mitigation/, Accessed from Internet on Apr. 11, 2022, 12 pages.
Bot removal in Adobe Analytics, Adobe Experience League, Available Online at: https://experienceleague.adobe.com/docs/analytics/admin/admin-tools/bot-removal/bot-removal.html, Feb. 23, 2022, 6 pages.
Captcha, Wikipedia, Available Online at: https://en.wikipedia.org/wiki/CAPTCHA, Mar. 18, 2022, 10 pages.
Exposing Financial Crime Holistic visibility of Money Laundering and Crime, Symphony Ayasdi, Available Online at: https://www.ayasdi.com/, Accessed from Internet on Apr. 11, 2022, 11 pages.
From AI to Walled Gardens: The Top 5 Trending Topics in Advertising, Adobe External Blog, Available Online at: https://blog.adobe.com/en/publish/2018/06/14/ai-walled-gardens-top-5-trending-topics-advertising.html, accessed from Internet on Aug. 3, 2022, 11 pages.
Gartner's Magic Quadrant for Web Application and Firewalls, Gartner, Available Online at: https://www.gartner.com/en/documents/3991674, Oct. 13, 2020, 7 pages.
Mobile, Adobe Experience League, Available Online at: https://experienceleague.adobe.com/docs/target/using/audiences/create-audiences/categories-audiences/mobile.html, Mar. 14, 2022, 4 pages.
Online Fraud & Bot Management for Mobile Apps, Websites, & Apis, Datadome, Available Online at: https://datadome.co/, Accessed from Internet on Apr. 11, 2022, 12 pages.
PerimeterX Bot Defender® Bot mitigation: Stop automated bot attacks, PerimeterX, Available Online at: https://www.perimeterx.com/products/bot-defender/, Accessed from Internet on Apr. 11, 2022, 10 pages.
The 13 Providers That Matter Most and How They Stack Up, The elchanancha New Wave™: Bot Management, Q1 2020, Available Online at: https://www.forrester.com/report/The-Forrester-New-Wave-Bot-Management-Q1-2020/RES158095, Jan. 29, 2020, 2 pages.
Topological Data Analysis, IBM Research, Available Online at: https://researcher.watson.ibm.com/researcher/view_group.php?id=6585, Accessed from Internet on Apr. 11, 2022, 3 pages.
Bodnar et al., Deep Graph Mapper: Seeing Graphs through the Neural Lens, arXiv:2002.03864v2, Available Online at: https://arxiv.org/abs/2002.03864, 2020, 13 pages.
Bruel-Gabrielsson et al., A Topology Layer for Machine Learning, 23rdInternational Conference on Artificial Intelligence and Statistics (AISTATS), 2020, 13 pages.
Carlsson et al., Topological Approaches to Deep Learning, arXiv:1811.01122, Available Online at: https://arxiv.org/abs/1811.01122, Nov. 6, 2018, 23 pages.
Minervino, Topological Data Analysis with Mapper—Quantmetry, Nov. 13, 2020, 12 pages. Printed from https://www.quantmetry.com/blog/topological-data-analysis-with-mapper/.
Chazal et al., An Introduction to Topological Data Analysis: Fundamental and Practical Aspects for Data Scientists, arXiv:1710.04019, Available Online at: https://arxiv.org/abs/1710.04019, Feb. 26, 2021, 44 pages.
Clough et al., A Topological Loss Function for Deep-Learning based Image Segmentation using Persistent Homology, arXiv:1910.01877v2, Available Online at: https://arxiv.org/abs/1910.01877, Sep. 18, 2020, 14 pages.
Abou Daya et al., BotChase: Graph-Based Bot Detection Using Machine Learning, IEEE Transactions on Network and Service Management, vol. 17, No. 1, Mar. 2020, pp. 15-29.
Dhamnani et al., Botcha: Detecting Malicious Non-Human Traffic in the Wild, Proceedings of the Workshop on Online Misinformation- and Harm-Aware Recommender Systems Co-Located with 14th ACM Conference on Recommender Systems, vol. 2758, 2020, pp. 51-59.
Elkan et al., Learning Classifiers from Only Positive and Unlabeled Data, Proceedings of the 14th ACM SIGKDD International Conference on Knowledge Discovery and Data Mining, Aug. 24-27, 2008, pp. 213-220.
Gaines, Attack of the Robots: Cleansing Your Data From Machine-Generated Traffic, Adobe Blog, Available Online at: https://blog.adobe.com/en/publish/2014/04/22/attack-robots-cleansing-data-machine-generated-traffic.html, Apr. 22, 2014, 7 pages.
Ghrist, Barcodes: The Persistent Topology of Data, Bulletin of the American Mathematical Society, vol. 45, 2008, pp. 61-75. Obtained online at https://www2.math.upenn.edu/~ghrist/preprints/barcodes.pdf.
Hasson, Bad Bot Report 2021—The Pandemic of the Internet, Imperva, Available Online at: https://www.imperva.com/blog/bad-bot-report-2021-the-pandemic-of-the-internet/, Apr. 13, 2021, 5 pages.
Kingma et al., Adam: A Method for Stochastic Optimization, International Conference on Learning Representations, Available Online at: https://arxiv.org/pdf/1412.6980v1.pdf, Dec. 22, 2014, pp. 1-9.
Liu et al., Partially Supervised Classification of Text Documents, ICML Proceedings of the Nineteenth International Conference on Machine Learning, Jul. 2002, pp. 387-394.
Loughrey et al., The Topology of Data: Opportunities for Cancer Research, Bioinformatics, vol. 37, No. 19, Jul. 28, 2021, pp. 3091-3098.
Masoomy et al., Topological Analysis of Interaction Patterns in Cancer-specific Gene Regulatory Network: Persistent Homology Approach, Scientific Reports, vol. 11, No. 16414, Aug. 12, 2021, 11 pages.

(56) References Cited

OTHER PUBLICATIONS

Matisof, Advance Your Bot Filtering Powers, Adobe Blog, Available Online at: https://blog.adobe.com/en/publish/2017/08/03/advance-bot-filtering-powers, Aug. 3, 2017, 6 pages.
Moor, Topological Autoencoders, Proceedings of the 37th International Conference on Machine Learning, PMLR, 2020, 11 pages.
Mosinska et al., Beyond the Pixel-Wise Loss for Topology-Aware Delineation, IEEE/CVF Conference on Computer Vision and Pattern Recognition (CVPR), 2018, pp. 3136-3145.
Munch, A User's Guide to Topological Data Analysis, Journal of Learning Analytics, vol. 4, No. 2, 2017, pp. 47-61.
Nguyen et al., Bot Detection on Social Networks Using Persistent Homology, Mathematical and Computational Applications, vol. 25, No. 3, 2020, pp. 1-16.
Phillips, Lecture 04: Advanced Data Visualization, CS 6965, University of Utah, 2018, 45 pages.
Rieck et al., Neural Persistence: A Complexity Measure for Deep Neural Networks Using Algebraic Topology, International Conference on Learning Representations (ICLR), 2019, 25 pages.
Singh et al., Topological Methods for the Analysis of High Dimensional Data Sets and 3D Object Recognition, Eurographics Symposium on Point-Based Graphics, 2007, 11 pages.
Smith et al., Topological Data Analysis: Concepts, Computation, and Applications in Chemical Engineering, arXiv:2006.03173v2, Available Online at: https://arxiv.org/abs/2006.03173, Nov. 10, 2020, 42 pages.
Solomon et al., A Fast and Robust Method for Global Topological Functional Optimization, In: 24th International Conference on Artificial Intelligence and Statistics (AISTATS), 2021, 10 pages.
Tavallaee et al., A detailed Analysis of the KDD CUP 99 Data Set, IEEE Symposium on Computational Intelligence for Security and Defense Applications, 2009, 6 pages.
Bodnar C, Cangea C and Liò P (2021). Deep Graph Mapper: Seeing Graphs Through the Neural Lens. Front. Big Data 4:680535. doi: 10.3389/fdata.2021.680535.

* cited by examiner

IDENTIFYING BOT ACTIVITY USING TOPOLOGY-AWARE TECHNIQUES

TECHNICAL FIELD

This disclosure relates generally to artificial intelligence. More specifically, but not by way of limitation, this disclosure relates to identification of bot activity using predictive models trained using topology-aware techniques.

BACKGROUND

With the advent of technology, more and more data is being generated and collected at data centers. An entity (e.g., a company) may have a large stack of click log data that represents the hits occurring across its communication channels (which may include one or more websites, mobile websites, and/or apps, etc.). Not all the data collected is user-authenticated, and a substantial portion of the data may be due to anonymous click activity, including but not limited to automated bots, each of which may be malicious or benign. It has been reported that almost a third of the web traffic is due to bot activity, more than half of which bears malicious intent.

Adverse effects resulting from excessive bot activity may include network congestion, unwanted consumption of network resources, network security concerns, reduced ability of human users to access network resources, and/or reduced ability to analyze and respond to the actual use of the network resources by human users. The influx of bot activity has been a concern for many industries, spanning a diverse range of fields including telecommunications, information technology (IT), sports, travel, etc.

The proportion of bot traffic present in web log datasets has been seen to vary from 55% up to as much as 97%. In the past, bot detection and filtering has been done using techniques based on standard rules. In light of the large degree of bot activity and the wide range of current bot behaviors, an adaptable solution may be preferred.

SUMMARY

Certain embodiments involve identifying bot activity using topology-aware techniques and, in some cases, causing a user interface of an online interactive computing environment to be modified. For example, a method for identifying bot activity includes receiving a plurality of samples, wherein each sample is a record of click activity by a corresponding user, and classifying the plurality of samples among a first class and a second class, using a machine learning model, to produce corresponding classification predictions. Certain embodiments also include filtering click activity data, based on information from the classification predictions, to produce filtered click activity data, and modifying a user interface of a computing environment based on information from the filtered click activity data. In one example, filtering the click activity data comprises excluding activity of bot users.

Training the machine learning model includes using a training set of samples of the first class, a training set of samples of the second class, and values of a topological loss function calculated by a topological loss function module. Training the machine learning model also includes selecting the training set of samples of the second class from a mixed plurality of samples that includes labeled samples of the first class and unlabeled samples, according to class probabilities of the samples of the mixed plurality.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
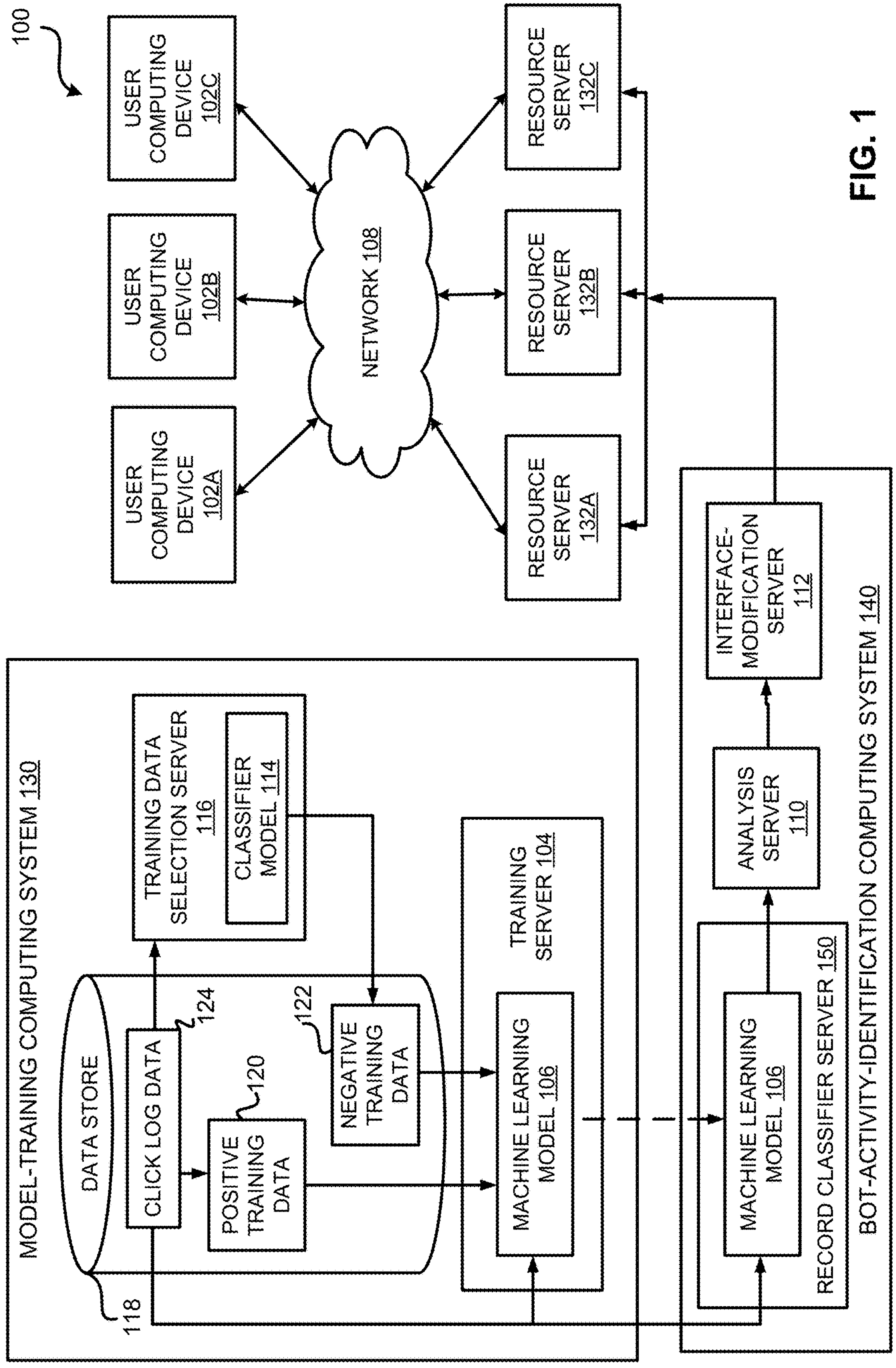
FIG. 1 depicts an example of a computing environment in which a model-training computing system employs a training data selection server to generate labeled training data for a machine learning model and a bot-activity-identification computing system employs an interface-modification server to modify a user interface of a computing environment, according to certain embodiments of the present disclosure.

Certain embodiments involve identifying bot activity using topology-aware techniques. For example, a bot-activity-identification computing system is configured to classify a set of samples among a positive class (e.g., a human activity class) and a negative class (e.g., a bot activity class) using a machine learning model. The machine learning model is trained using a training set of samples of the positive class and a training set of samples of the negative class, based on a topological loss function that is calculated based on the training set of samples of the positive class and the training set of samples of the negative class. The training set of samples of the second class is selected from a mixed plurality of samples that includes labeled samples of the first class and unlabeled samples, according to class probabilities of the samples of the mixed plurality. The bot-activity-identification computing system further uses information from the classifications to filter click activity data to exclude click activity by bot users, and, in some cases, modifies a user interface of a computing environment based on information from the filtered click activity data.

The following non-limiting example is provided to introduce certain embodiments. In this example, a bot-activity-identification computing system employs a machine learning model to distinguish records of click activity by human users from records of click activity by bot users. The records of click activity (collectively referred to as "click log data") are collected from user accesses to online resources via an interactive computing environment. Examples of these resources include web servers, mobile web servers, app servers, etc.

The click log data includes records of click activity by authenticated human users and records of click activity by unauthenticated users, who may be human or bot. Accordingly, labeled samples of bot activity may not be available for training. To obtain training data for the machine learning model, a training data selection server is used to extract a set of reliable samples of bot activity from the click log data. The machine learning model is trained using samples of activity by authenticated human users, the reliable samples of bot activity, and a topological loss function that indicates a similarity between the input and latent spaces for each of the two classes (e.g., positive (or human), and negative (or bot)).

Once trained, the machine learning model is used to classify samples of the click log data by outputting a classification prediction (e.g., a prediction score) indicating a probability that the sample is activity of a bot user. An analysis server uses the classification predictions to filter click activity data to exclude activity by bot users, and an interface-modification server modifies a user interface of a computing environment based on information from the filtered click activity data (e.g., based on activity arising from real human users rather than from bots). While results for web log datasets from several different industry domains are presented below, techniques as described herein are portable to other reporting applications as well, examples of which include data analytics, web experience management, etc.

As described herein, certain embodiments provide improvements to online resource management by solving problems that are specific to online platforms. Examples of online resources include websites and other user interfaces to an interactive computing environment, which may be hosted on one or more web servers, mobile web servers, or app servers. It may be desired to reconfigure or otherwise modify a user interface to an interactive computing environment (e.g., to modify a website or other communication channel) to operate more efficiently and/or to optimize one or more identified performance metrics. Network throughput may be increased, for example, by modifying a website in order to reduce an average response time for one or more of its web pages. Network bandwidth consumption may be reduced, for example, by modifying a website to reduce the number of web pages of the website that a user must visit in order to reach a particular destination web page. Such modifications may be guided by an analysis of traffic to the website (e.g., web log data) to determine patterns and statistics that characterize the website's operation. The results of such analysis may be unreliable if a significant proportion of the traffic being analyzed is generated by bot activity.

Because this resource configuration problem is specific to online resources, embodiments described herein utilize automated models that are uniquely suited for online resource management. To support meaningful traffic analysis, a machine learning model that is trained by the model-training computing system can be utilized by the bot-activity-identification computing system to intelligently distinguish traffic due to human users from traffic due to bot activity. Consequently, certain embodiments more effectively facilitate configuration of online resources, as compared to existing systems.

As used herein, the term "website" is used to refer to a traditional website (e.g., for access via a personal computer) or to a mobile website (e.g., having content that scales to fit the screen size of the client device, such as a tablet or smartphone). As used herein, the term "communication channel" is used to refer to a website, which may include multiple web pages, or to an application executing on an app server for communication with a dedicated software application installed on a client device (a "native application" or "app") or with a web application ("web app") executing within a browser on a client device.

As used herein, the term "click activity" is used to refer to web activity (e.g., requests for web pages) and also to requests (e.g., HTTP requests) received from native apps or web apps. The terms "record of click activity" and "record of web activity" are used to refer to a record that indicates the resource requested (e.g., the web page or other HTTP resource) and the requesting user (e.g., the user's IP address and/or other identifying feature) and may also indicate further information, such as, for example, any one or more of the time of the request, the user's browser and/or device type, which page features the user engaged, geographical information of the user, the website that referred the user, etc. The term "click log data" is used to refer to a collection of records of click activity, and the term "web log data" is used to refer to a collection of records of web activity.

As used herein, the term "bot" is used to refer to a software agent that issues requests for web pages autonomously. As used herein, the term "authenticated" is used to refer to a user who is assumed to be human (e.g., because the user is logged in to the website and/or has made a purchase at the website).

As used herein, the term "hit" is used to refer to a request for a web page. As used herein, the term "session" is used to refer to a series of hits made by a user during a visit to a website, where the end of the session is indicated by a termination event (e.g., the user logging out) or by a specified period (e.g., five, ten, twenty, or thirty minutes) of inactivity by the user.

As used herein, the term "positive training data" is used to refer to data samples that are labeled as positive (e.g., samples corresponding to activity by human users), and the term "negative training data" is used to refer to data samples that are labeled as negative (e.g., samples corresponding to activity by bots).

Referring now to the drawings, FIG. 1 is an example of a computing environment 100 in which a model-training computing system employs a training data selection server to generate labeled training data for a machine learning model and a bot-activity-identification computing system employs an interface-modification server to modify a user interface of a computing environment. In various embodiments, the computing environment 100 includes a model-training computing system 130, a bot-activity-identification computing system 140, and one or more resource servers 132A-132C (which may be referred to herein individually as a resource server 132 or collectively as the resource servers 132). The bot-activity-identification computing system 140 is configured for modifying a user interface to various resources hosted on the resource servers 132 that may be accessed by one or more user computing devices 102A-102C (which may be referred to herein individually as a user computing device 102 or collectively as the user computing devices 102).

The resource servers 132 host an online interactive computing environment through which various types of resources can be accessed, such as computing resources, data storage resources, digital content resources and the like. Computing resources may be available as virtual machines configured to execute applications, such as Web servers, application servers, or other types of applications. For example, the resource servers 132 may host one or more of an entity's websites, each of which include web pages that provide information to users about the entity and/or its products via the online interactive computing environment. A website may be a traditional website (e.g., for access via a personal computer) or a mobile website (e.g., having content that scales to fit the screen size of the client device, such as a tablet or smartphone). Additionally or alternatively, the resource servers 132 may host one or more of an entity's other consumer communication channels. For example, the resource servers 132 may include one or more servers that provide content to native applications ("apps") and/or web applications ("web apps"). Examples of data storage resources include single storage devices, a storage area network, and so on. Digital content resources may include any type of digital contents, such as images, audio, video, files, web pages, emails, text, and the like.

User computing devices 102 can access the online resources through a network 108. For example, a user can employ a user computing device 102 to access, via the online interactive computing environment, one or more websites hosted on the resource servers 132. The user computing device 102 can access the resources in a pull mode or a push mode. In the pull mode, a user computing device 102 connects to the resource server 132 and proactively requests certain content. In the push mode, the resource server 132 sends certain content or recommendation for content to the user computing device 102 without an explicit request from the user computing device 102. In either mode, the request for content, the recommendation for the content, the interactive content or the content itself can be sent though the network 108, which may be a local-area network ("LAN"), a wide-area network ("WAN"), the Internet, or any other networking topology known in the art that connects the user computing device 102 to the resource servers 132.

The model-training computing system 130 can include a training data selection server 116 and a training server 104. The training data selection server 116 can be configured to provide a training set of samples of a second class (e.g., a negative class). For example, the training data selection server 116 can be configured to calculate, for each sample of a mixed plurality of samples that includes labeled samples of a first class and unlabeled samples, a corresponding class probability for the sample, wherein each of the labeled samples of the mixed plurality is a record of click activity by a corresponding authenticated user, and each of the unlabeled samples of the mixed plurality is a record of click activity by a corresponding unauthenticated user. The training data selection server 116 can be configured to also select, from among the unlabeled samples of the mixed plurality of samples, each of a plurality of samples of a training set of samples of a second class according to the class probability of the sample.

The training server 104 can be configured to train a machine learning model 106 to classify samples among a first class (e.g., a positive class or a human activity class) and the second class (e.g., a negative class or a bot activity class). For example, the training server 104 can be configured to train the machine learning model to classify samples among the first and second classes, using a training set of samples of the first class, the training set of samples of the second class, and values of a topological loss function that is based on a first distance between a topological signature of an input space of the first class and a topological signature of a latent space of the first class.

The bot-activity-identification computing system 140 can include a record classifier server 150, an analysis server 110, and an interface-modification server 112. The record classifier server 150 can be configured to classify samples among the first and second classes. For example, the record classifier server 150 can be configured to receive a plurality of samples, wherein each of the plurality of samples is a record of click activity, and to process each of the plurality of samples, using the machine learning model trained by the training server 104, to generate a corresponding one of a plurality of classification predictions that indicates a class probability among a first class and a second class.

The analysis server 110 can be configured to filter click activity data based on the classification predictions generated by the record classifier server 150. For example, the analysis server 110 can be configured to filter click activity data, based on information from the classification predictions, to produce filtered click activity data. The analysis server 110 may be configured to generate at least one filtering criterion, based on the information from the plurality of classification predictions, and to exclude the activity of bot users from the filtered click activity data, based on the at least one filtering criterion. The click activity data includes activity of bot users, and the analysis server 110 may be configured to cluster the plurality of samples, based on the plurality of classification predictions, to obtain a plurality of clusters; to calculate, for each of a plurality of statistics, a corresponding value of the statistic for each of the plurality of clusters to obtain a plurality of values of the statistic; and to exclude the activity of bot users from the filtered click activity data, based on information from the plurality of values of each of the plurality of statistics. In such case, the analysis server 110 can be configured to also generate a graph that comprises a plurality of nodes and a plurality of edges, wherein each of the plurality of nodes corresponds to one of the plurality of clusters and each of the plurality of edges connects a pair of the plurality of nodes that corresponds to a pair among the plurality of clusters that share samples of the plurality of classified samples.

The interface-modification server 112 can be configured to modify a user interface of a computing environment based on information from the filtered click activity data. For example, the interface-modification server 112 can be configured to modify a user interface to an online computing environment hosted on the resource servers 132 based on information from the filtered click activity data.

Techniques described herein leverage topological differences to distinguish bot activity from activity by real human users in click log data. The click log data 124 may include samples collected from a website or from multiple related communication channels, such as one or more websites, mobile websites, and/or apps of the same business entity (e.g., company). The click log data 124 may also include samples collected from unrelated communication channels, such as from websites and/or other communication channels of multiple different business entities. In one example, each sample in the click log data 124 is a record of a session of click activity by a corresponding user. Such aggregation of the click log data 124 at session level (e.g., rather than at click level) produce a model that is scalable and efficient for large data. Session level modelling also provides for granular classification.

A supervised approach to classifying records of click activity as human activity or bot activity may not be feasible. While in some situations it may be easy to tag an activity of a human user (e.g., activity that includes a purchase, and/or an authentication (e.g., log-in)), a large portion of click activity by human users may be unlabeled. Techniques are described herein that include operation in a semi-supervised classification scenario (e.g., in the presence of unlabeled data). For example, such a technique may use only a single class label to learn the classification boundary between human activity and bot activity.

To compensate for a comparative lack of verified negative samples, the model-training computing system 130 employs a training data selection server 116 to generate negative training data for the machine learning model 106. The training data selection server 116 builds and trains a classifier model 114 based on positive samples and unlabeled samples from the click log data 124 and uses the trained classifier model 114 to generate negative training data 122. Detailed examples of building and training the classifier model 114 and generating the negative training data 122 are provided below with respect to FIGS. 2-6.

The model-training computing system 130 can use the training server 104 to train the machine learning model 106 with the positive training data 120 and the negative training data 122. The model-training computing system 130 may further include a data store 118 for storing the click log data 124, the positive training data 120, the negative training data 122, and other data associated with data training and classification management.

The bot-activity-identification computing system 140 can use the trained machine learning model 106 to classify samples from click log data (e.g., from the click log data 124). For example, the record classifier server 150 can use the trained machine learning model 106 to generate a classification prediction for each sample, such as a class probability and/or a predicted label. The analysis server 110 can filter click activity data (e.g., from the click log data 124 or from another store or stream of click activity) based on information from the classification predictions, and based on the filtered click activity data, the interface-modification server 112 can modify a user interface to an online computing environment hosted on the resource servers 132.

The bot-activity-identification computing system 140 uses the classification predictions generated by the trained machine learning model 106 to filter bot traffic from click activity data (which may include historical and/or real-time user activity). Such filtering allows for analysis of activity of human users in a dataset (e.g., a web log or other click log of a business entity), which may be used to support visualization of customer segments, visualization of session clusters, and/or better cluster description. For example, the analysis server 110 may produce traffic filtering criteria to capture or otherwise exclude bot traffic. A model-based approach as described here allows for filtering criteria that can adapt to changes in bot behavior, as opposed to standardized bot rules.

Figure 2:
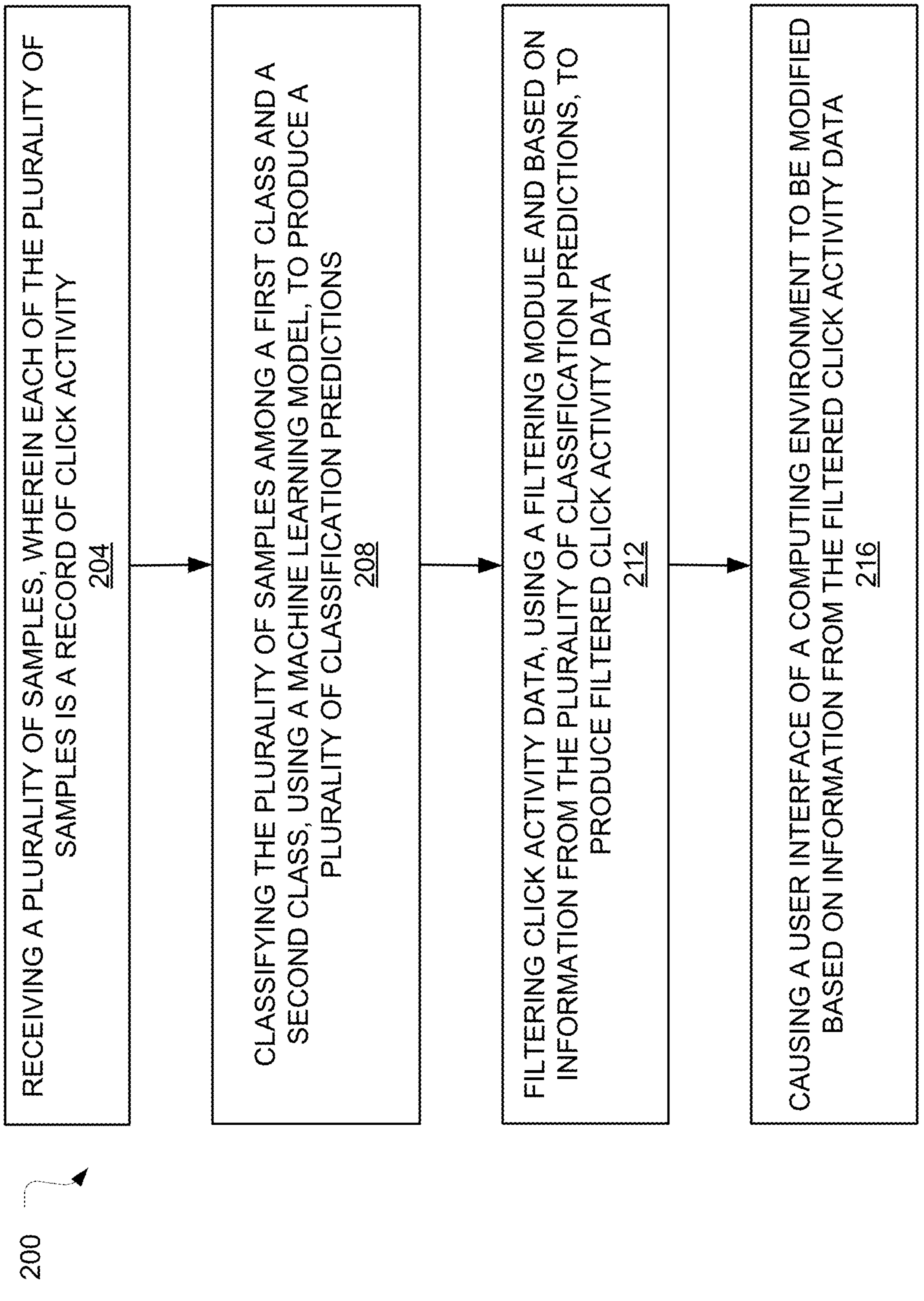
FIG. 2 depicts a flow diagram for identifying bot activity and in some cases causing a user interface of a computing environment to be modified, according to certain embodiments of the present disclosure.

FIG. 2 depicts an example of a process 200 for identifying bot activity and in some cases causing a user interface of a computing environment to be modified, according to certain embodiments of the present disclosure. One or more computing devices (e.g., the bot-activity-identification computing system 140) implement operations depicted in FIG. 2 by executing suitable program code. For illustrative purposes, the process 200 is described with reference to certain examples depicted in the figures. Other implementations, however, are possible.

At block 204, the process 200 involves receiving samples, with each sample including a record of click activity. These samples include records of click activity by corresponding authenticated users (e.g., humans) and records of click activity by corresponding unauthenticated users (e.g., humans and bots). For example, these samples may include records of sessions of click activity by corresponding users.

At block 208, the process 200 involves classifying the samples among a first class (e.g., a positive class) and a second class (e.g., a negative class), using a machine learning model 106, to produce classification predictions. The first class indicates, for example, a class that corresponds to human users, and the second class indicates, for example, a class that corresponds to bot users. Additional examples of classifying the plurality of samples are provided below with respect to FIG. 5. The machine learning model is trained by a training process, examples of which are provided below with respect to FIG. 3. Block 208 can be used to implement a step for classifying, by a record classifier server, the plurality of samples among a first class and a second class, using a machine learning model, to produce a corresponding plurality of classification predictions, wherein the machine learning model is trained by a training process. Block 208 can be used to implement a step for processing each of a plurality of samples, using a machine learning model, to generate a corresponding one of a plurality of classification predictions that indicates a class probability among a first class and a second class, wherein the machine learning model is trained by a training process.

At block 212, the process 200 involves filtering click activity data (e.g., from a store or stream of click activity), using a filtering module 720 and based on information from the classification predictions, to produce filtered click activity data. The click activity data includes activity of human users and activity of bot users. The filtering module 720 may apply at least one filtering criterion based on the information from the classification predictions, for example, and may exclude activity of bot users from the filtered click activity data, based on the at least one filtering criterion. Block 212 can be used to implement a step for filtering click activity data, by a filtering module and based on information from the plurality of classification predictions, to produce filtered click activity data.

At block 216, the process 200 involves causing a user interface of a computing environment to be modified, using an interface-modification server 112 and based on information from the filtered click activity data. The interface-modification server 112 modifies the user interface of the computing environment according to one or more characteristics of the filtered click activity data, such as, for example: a probability of a path among web pages of a website, a probability of a transition from a first web page of a website to a second web page of the website (e.g., a probability of selection of an particular option on the first web page), a probability that a web page of a website is visited given entry to the website from a particular referrer, etc. Examples of modifying a user interface of a computing environment include altering a web page of a website; adding one or more web pages to a website and/or removing one or more pages from the website; reconfiguring a server to reduce a time required to serve one or more particular web pages of a website; adding a link (e.g., a banner) to a website that, when the link is clicked, takes a user to a third-party website; etc. Block 216 can be used to implement a step for causing a user interface of a computing environment to be modified based on information from the filtered click activity data.

Figure 3:
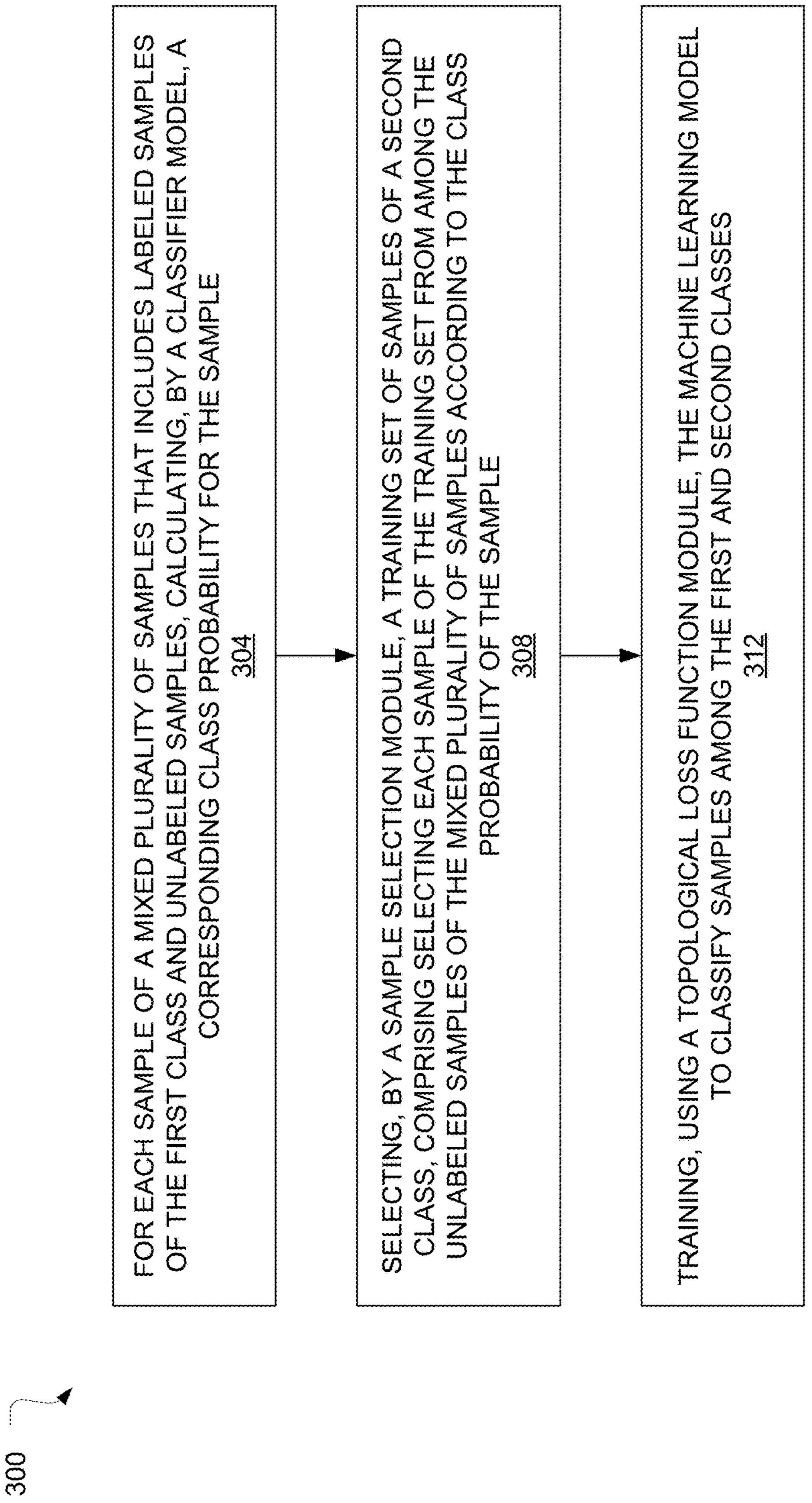
FIG. 3 depicts a flow diagram for training a machine learning model, according to certain embodiments of the present disclosure.

FIG. 3 depicts an example of a process 300 for training the machine learning model 106 using labeled training data 120 and 122, according to certain embodiments of the present disclosure. One or more computing devices (e.g., the model-training computing system 130, the training data selection server 116, and/or the training server 104) implement operations depicted in FIG. 3 by executing suitable program code. For illustrative purposes, the process 300 is described with reference to certain examples depicted in the figures. Other implementations, however, are possible.

At block 304, the training process involves, for each sample of a mixed plurality of samples that includes labeled samples of the first class and unlabeled samples, calculating, by a classifier model 114, a corresponding class probability for the sample. Each of the labeled samples of the mixed plurality is a record of click activity by a corresponding authenticated user, and each of the unlabeled samples of the mixed plurality is a record of click activity by a corresponding unauthenticated user. Additional examples of calculating the corresponding class probabilities are provided below with respect to FIG. 4.

At block 308, the training process involves selecting, by a sample selection module (e.g., of training data selection server 116), a training set of samples of a second class. Selecting the training set of samples of the second class comprises selecting each sample of the training set from among the unlabeled samples of the mixed plurality of samples according to the class probability of the sample. Additional examples of selecting the training set of samples of the second class are provided below with respect to FIG. 4.

At block 312, the training process involves training, using a topological loss function module (e.g., of training server 104), the machine learning model 106 to classify samples among the first and second classes, using a training set of samples of the first class, the training set of samples of the second class, and values of a topological loss function calculated by the topological loss function module. Each sample in the first training set is a record of click activity by a corresponding authenticated user. Additional examples of training the machine learning model 106 at block 312 are provided below with respect to FIG. 5.

The machine learning model 106 can be any machine learning model configured to accept samples 124 as inputs and classify the samples among the first and second classes. For example, the machine learning model 106 can be a logistic regression model, a naive Bayes model, a neural network (e.g., a deep neural network), or another type of trained model. The training at block 312 may involve iteratively adjusting the parameters of the machine learning model 106, based on values of the topological loss function, so that the output space of the machine learning model 106 given the positive training data 120 is close to the corresponding input space of the positive training data 120 and the output space of the machine learning model 106 given the negative training data 122 is close to the corresponding input space of the negative training data 122. Blocks 304-312 can be used to implement a step for training the machine learning model to generate a classification prediction for an input sample that indicates a probability of the input sample belonging to a first class or a probability of the input sample belonging to a second class.

Figure 4:
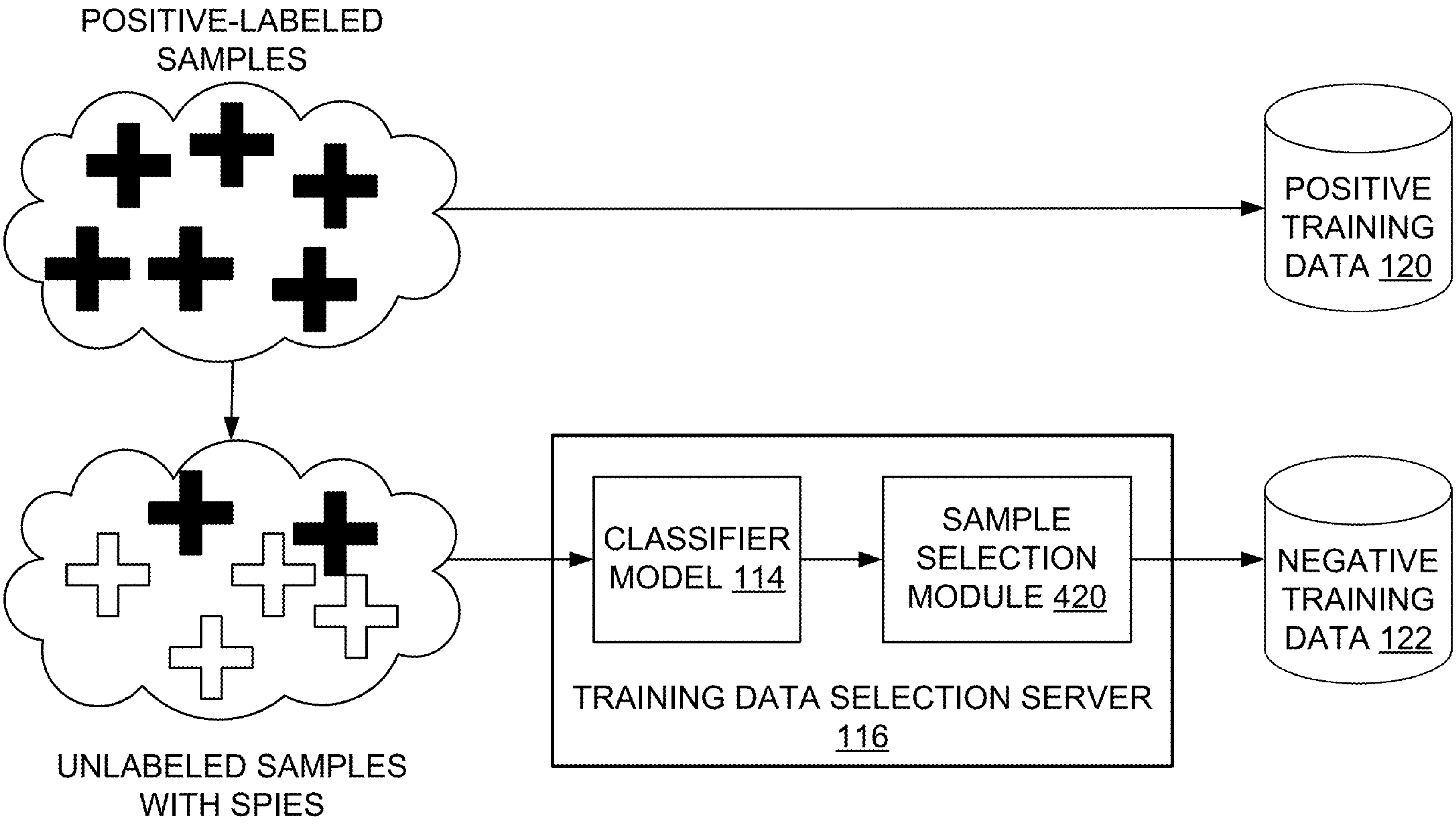
FIG. 4 depicts a block diagram of a training data selection server, according to certain embodiments of the present disclosure.

As shown in FIG. 4, the training data selection server 116 employs a classifier model 114 to calculate the corresponding class probabilities (e.g., the probability that an input sample belongs to the first class, or the probability that the input sample belongs to the second class) and a sample selection module 420 to select the training set of samples of the second class.

A fully labelled dataset of samples of click activity is relatively hard to obtain. Among a collection of click log data, records of activity by authenticated users (e.g., users who are logged-in to a website) may be identified and labeled, but it may not be feasible to label records of other traffic, which includes both activity by un-authenticated human users (e.g., users who are not logged-in to the website) and activity by bot users. An unsupervised approach may be used to assign labels to unlabeled data samples to provide a more reliable dataset for training of the machine learning model 106. In some examples, such an approach is performed using Positive-Unlabeled learning ("PU learning").

PU learning is a technique for training a binary classifier using only a set of positive-labeled samples (P) and a set of unlabeled samples (U), where the set of unlabeled samples includes samples of the positive class and samples of the negative class. As shown in FIG. 4, some of the positive-labeled samples are turned into 'spies' by adding them to the set of unlabeled samples to obtain a mixed plurality of samples. The classifier model 114 (e.g., a logistic classifier, a deep neural network, a support vector machine (SVM), etc.) is trained on this mixed plurality of samples, with the unlabeled samples being considered as samples of the negative class, and the trained classifier model 114 is updated once using expectation maximization. For instance, the training optimization may be based on a supervised loss function such as cross entropy.

The classifier model 114 (e.g., as trained and updated) calculates, for each sample of the mixed plurality of samples, a corresponding class probability for the sample, and a sample selection module 420 selects a set of reliable negative samples 122 according to the calculated class probabilities. For example, the reliable negative samples 122 may be defined as all unlabeled samples for which the corresponding posterior probability is lower than the posterior probability of any of the spies (e.g., all unlabeled samples for which the corresponding calculated class probability is lower than the lowest among the calculated class probabilities of the spies).

Figure 5:
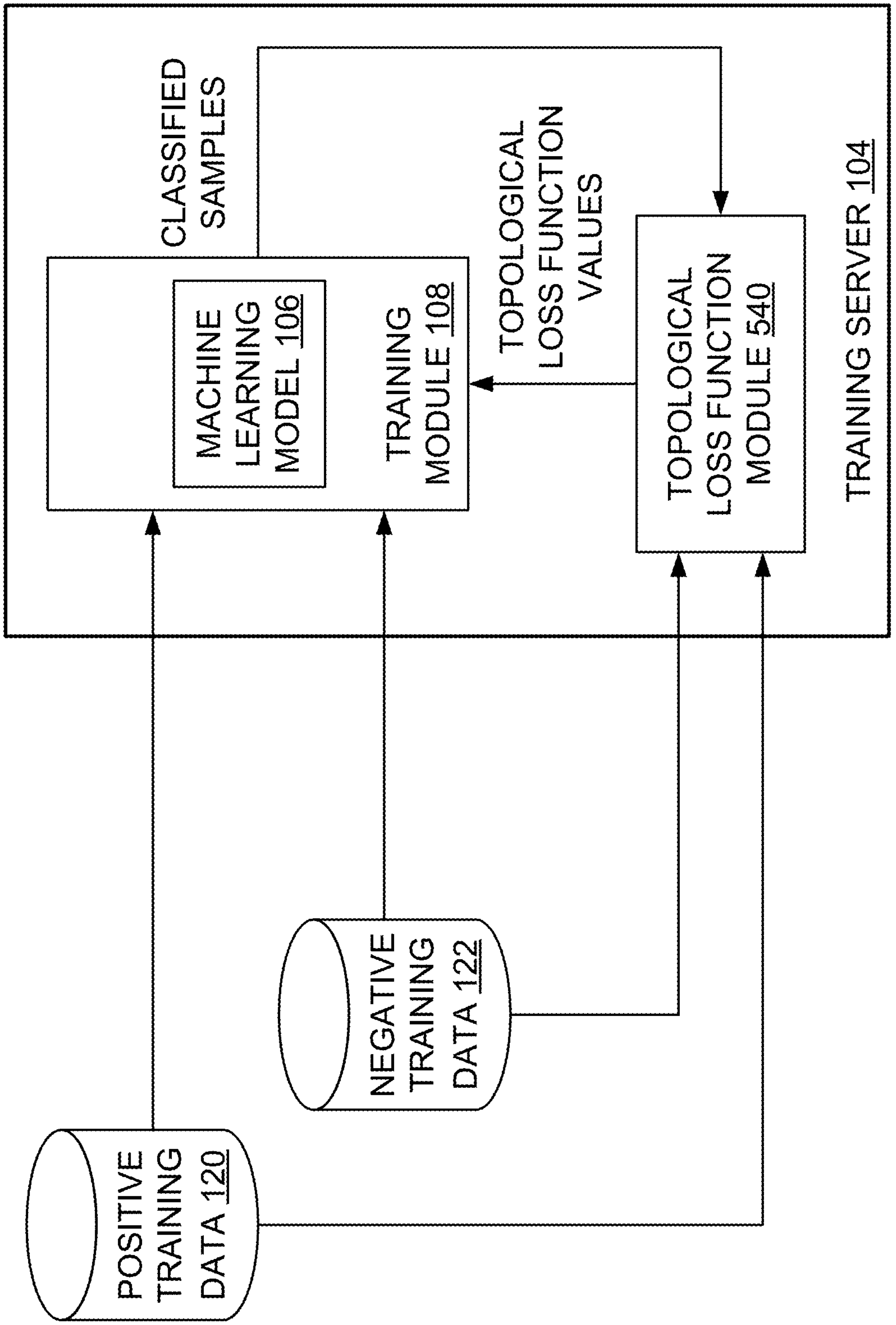
FIG. 5 depicts a block diagram of a training server, according to certain embodiments of the present disclosure.

As shown in FIG. 5, the training server 104 employs a set of the positive samples 120, the set of reliable negative samples 122, and a topological loss function module 540 to train the machine learning model 106 to classify samples among the first and second classes. For example, the training server 104 may include a training module 108 that iteratively adjusts the parameters of the machine learning model 106, based on topological loss function values calculated by the topological loss function module 540, so that a topological signature of the output space of the machine learning model 106 when given the positive training data 120 is close to a topological signature of the input space (of the positive training data 120), and likewise so that a topological signature of the output space of the machine learning model 106 when given the negative training data 122 is close to a topological signature of the input space (of the negative training data 122).

Figure 6:
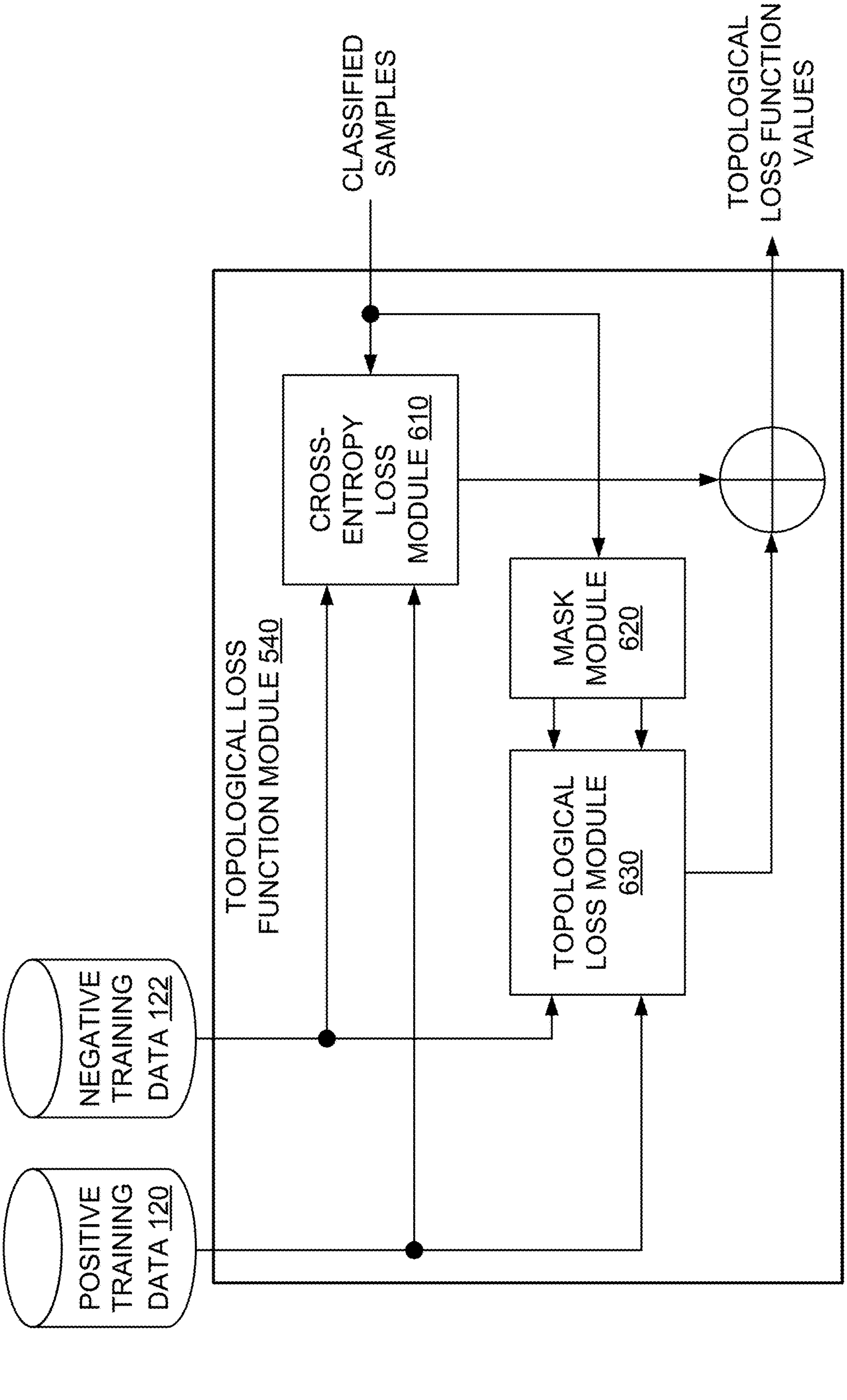
FIG. 6 depicts a block diagram of a topological loss function module, according to certain embodiments of the present disclosure.

As shown in FIG. 6, the topological loss function module 540 calculates the values of the topological loss function from the positive samples 120, the reliable negative samples 122, and the classified samples using a cross-entropy loss module 610, a mask module 620, and a topological loss module 630. The topological loss function may include a cross-entropy loss term and a topological loss term, as shown, for example, in Expression 1 below:

$$\text{Loss}=\text{BCE}(y,\hat{y})+\text{TLT} \quad [1]$$

where BCE (y,ŷ)) is the binary cross-entropy loss (e.g., a negative-log-likelihood loss) between the labels y of the training data 120 and 122 and the predicted values ŷ of the corresponding classified samples, and TLT is a topological loss term that penalizes topological differences between the input and output spaces of each class.

The topological loss function module 540 is implemented to calculate the topological loss term TLT as, for example, a regularization that is based on topological differences for the predicted logits and the original point cloud of the input space for each individual class. Topological regularization is a method for constraining the various spaces which are being trained so that they will follow a particular shape, where the constraint is imposed by penalizing the training process when the topology of a particular set of points (also called a "point cloud") differs from a given topology.

As shown in FIG. 6, the topological loss function module 540 includes a mask module 620 that uses the labels of the training data 120, 122 to separate the classified samples into a latent space for the first (positive) class and a latent space for the second (negative) class. The topological loss function module 540 also includes a topological loss module 630 that calculates, for each of the first and second classes, a similarity between the corresponding input and latent spaces based on their topological signatures.

For example, the topological loss module 630 may calculate, for each batch of samples from training sets 120 and 122, a corresponding value of the topological loss term TLT according to Expression 2 below:

$$TLT = \lambda * (TopoLoss(x^+, x_L^+) + TopoLoss(x^-, x_L^-)) \quad [2]$$

where λ is a regularization parameter that apportions the weight of the two loss terms BCE and TLT, and the parameter TopoLoss(s, $s_L$) indicates a similarity of an input space s and a corresponding latent space $s_L$ based on their topological signatures. In Expression 2, $x^+$ denotes the subset of positive samples of a batch x, $x^-$ denotes the subset of negative samples of the batch x, and $$x_L^+ \text{ and } x_L^-$$

denote the latent counterparts of these subsets, respectively.

The topological signatures of the input and latent spaces may be defined in terms of their persistent homologies, where the persistent homology of a space (e.g., a dataset) describes topological properties of the space that persist across multiple scales. One method for finding the persistent homology of a dataset is to perform a filtration of a simplicial complex that represents the dataset. The filtration may be performed, for example, by applying a distance function to the dataset as a "point cloud" (a set of points that define an n-dimensional space). At each stage of the filtration, the corresponding value of a parameter Hi denotes the number of features of dimension i that exist in the space at that stage. For example, H0 denotes the number of connected components, H1 denotes the number of two-dimensional holes, H2 denotes the number of three-dimensional voids, and so on. Initially each distinct point in the point cloud is a connected component, so that the initial value of H0 is equal to the number of distinct points in the point cloud.

One filtration that may be used is the Vietoris-Rips complex. For finite ε not less than zero, the Vietoris-Rips complex of a metric space X at scale c is a family of simplices of X, where each simplex is a subset of X whose elements are separated from each other by a distance that does not exceed c. The persistent homology of the Vietoris-Rips complex of the metric space X may be calculated to obtain, for each of at least one dimension d, a corresponding persistence diagram and persistence pairing. The persistence diagram for dimension d contains a coordinate tuple (a,b) for each d-D topological feature in the complex, where a is the value of c for which the feature is created and a is the value of c for which the feature is destroyed. Because all of the connected components (0-D topological features) are deemed to be present at the beginning of the filtration, a=0 for each tuple (a,b) in the persistence diagram for d=0. The persistence pairing for dimension d contains indices of simplices that create and destroy the d-D topological features identified by the tuples (a,b) in the persistence diagram for dimension d. The persistence pairing for d=0 contains indices of edges, for example, as edges are the simplices that destroy O-D features. In the examples described below, it is assumed, without limitation or loss of generality, that only the persistence pairing for dimension 0 is used.

In one example, the value of the parameter TopoLoss(s,$s_L$) for the input space (e.g., point cloud) $x^+$ and its latent counterpart $$x_L^+$$

may be calculated according to Expression 3 below:

$$TopoLoss(x^+, x_L^+) = L(x^+ \to x_L^+) + L(x_L^+ \to x^+) \text{ where} \quad [3]$$
$$L(x^+ -> x_L^+) = (1/2)\|A(x^+)[p(x^+)] - A(x_L^+)[p(x^+)]\|^2,$$
$$L(x_L^+ -> x^+) = (1/2)\|A(x_L^+)[p(x_L^+)] - A(x^+)[p(x_L^+)]\|^2.$$

In this example, $A(x^+)$ denotes a distance matrix of the input space $x^+$ (e.g., a matrix of pairwise distances of $x^+$), and $$A(x_L^+)$$

denotes a distance matrix of the latent space $$x_L^+$$

(e.g., a matrix of pairwise distances of $$x_L^+).$$

The distance metric may be the Euclidean distance, or another distance metric may be used. Also in this example, $p(x^+)$ denotes a persistence pairing of the input space $x^+$, and $$p(x_L^+)$$

denotes a persistence pairing of the input space $$x_L^+.$$

Any one of various filtration mechanisms may be used to construct the persistence pairings, such as, for example, the Vietoris-Rips complex as described above.

The values of a persistence diagram can be retrieved by subsetting (or 'indexing') the distance matrix with the simplex indices provided by the corresponding persistence pairing. The notation A[p] indicates an indexing of the matrix A by the set of indices p and represents a subset of A, such that $A(x^+)[p(x^+)]$ and $$A(x_L^+)[p(x^+)]$$

are vectors of paired distances having dimensionality equal to the number of simplices in the original space $x^+$, and $$A(x^+)[p(x_L^+)] \text{ and } A(x_L^+)[p(x_L^+)]$$

are vectors of paired distances having dimensionality equal to the number of simplices in the latent space $$x_L^+.$$

The persistent homology calculation can thus be seen as a selection of topologically relevant edges of the Vietoris-Rips complex, followed by the selection of corresponding entries in the distance matrix. The term $$L(x^+ -> x_L^+)$$

thus represents a loss in alignment of distance matrices that correspond to the input space $x^+$ and the latent space $$x_L^+,$$

respectively, with respect to edge indices obtained from the input space $x^+$, and the term $$L(x_L^+ -> x^+)$$

analogously represents the same loss in alignment but with respect to edge indices obtained from the latent space $$x_L^+.$$

The value of the parameter TopoLoss($x^-$, $$x_L^-)$$

in this example may be calculated in an analogous manner, where $x^-$ denotes the subset of negative samples of the batch x, and $$x_L^-$$

denotes the latent counterpart of this subset. The resulting topological loss term TLT is differentiable over the parameters of the model 106 for each update step during training and thus supports optimization by, e.g., gradient descent.

The classifier model 114 and machine learning model 106 were implemented using built-in classifiers from the scikit-learn library on a 32-core CPU with max-iterations equal to three hundred. A training batch of around 1024 samples was used, an 80-20 split on the training set was performed for the training-validation split, and the Adam algorithm was used for optimization with a learning rate of 1 e-5. In tests using the NSL-KDD dataset, which has ground truth labels for both kind of labels (humans and bots), a value of 0.7 for the regularization parameter λ in Expression 2 above was found to produce more accurate results and a higher F-score than a value of 0.1.

Testing was performed using multiple web log datasets from entities in different domains (here, telecommunications and financial) and time durations ranging to a maximum of ten days, giving an aggregate information (session length, time duration, geo-country, distinct pages, etc.) at user session level. The value of a binary response variable 'y' represents whether the user is authenticated (e.g., logged-in) in that session and is used as a proxy for the positive class (human users). As shown in Table 2, the fraction of unlabelled samples varies widely across these datasets.

TABLE 2

Summary statistics of collected datasets.

| Dataset (Domain) | Authenticated (%) | Unlabeled (%) | Total Size |
|---|---|---|---|
| A (Financial) | 21.4 | 78.6 | ~11M |
| B (Financial) | 10.3 | 89.7 | ~4.5M |
| C (Telecom) | 56.4 | 43.6 | ~4M |
| D (Telecom) | 3.4 | 96.6 | ~27M |

The classification predictions generated by machine learning model 106 may be used to filter click log data: for example, to exclude samples classified as bot activity from log data for further analysis. For example, such functionality may support network analysis by allowing for better reporting of resource use (more accurate reporting of activity due to audiences of the entity) or reducing a need to manually draft rules for identifying bot data. The ability to exclude bot activity from the log data to be analyzed may also enable accurate key performance indicator (KPI) reporting for data analytics and other reporting suites to be obtained in near-real-time.

In one example, prediction and analysis of click log data to identify bot activity in the underlying data (e.g., as provided by record classifier server 150 and analysis server 110) may be implemented as a wrapper service for use with products like web analytics software, audience manager software, marketing automation software, etc. Such products may include, but are not limited to, applications in ADOBE MARKETING CLOUD, such as ADOBE ANALYTICS, ADOBE AUDIENCE MANAGER, ADOBE CAMPAIGN, ADOBE EXPERIENCE MANAGER, ADOBE MEDIA OPTIMIZER, ADOBE PRIMETIME, ADOBE SOCIAL, ADOBE TARGET, and MARKETO. “ADOBE”, “ADOBE MARKETING CLOUD”, “ADOBE ANALYTICS”, “ADOBE AUDIENCE MANAGER”, “ADOBE CAMPAIGN”, “ADOBE EXPERIENCE MANAGER”, “ADOBE PRIMETIME”, “ADOBE SOCIAL”, “ADOBE TARGET”, and “MARKETO” are registered trademarks of Adobe Systems Incorporated in the United States and/or other countries. Such products may utilize the bot identification to perform further tasks such as, for example: improved and accurate reporting in web analytics software; understanding and distinguishing among patterns of human users interacting with the computing environment; discriminating among events in marketing automation software, such as discriminating between a received true-positive e-mail open event (e.g., as caused by a customer opening a promotional e-mail) and a received false-positive open event (e.g., as caused by an enterprise email security filter (bot) opening a promotional e-mail); etc.

Further applications for classification of samples of click log data 124 as performed by machine learning model 106 may include filtering click log data, based on the model's prediction confidence for bot activity, to segregate samples predicted to be from bot activity from samples predicted to be from human users, and storing the segregated click log data at different storage levels (e.g., hot vs. cold storage). Since activity due to bots may occupy about one-third of the collected data, overall storage costs may be reduced by keeping the records of bot activity in a separate (cold) storage which is relatively cost effective.

The predictions generated by the machine learning model 106 (e.g., segmentation of samples of an entity's session log data over a range of predicted human users to predicted bot users) may be used to generate hypotheses for data analysis. For example, analysis server 110 may evaluate one or more features for each of the classified samples and use the predictions generated by the machine learning model 106 to identify, from among the evaluated features, features that distinguish the classes. Such features (e.g., statistics) may be used as filtering criteria for bot identification techniques that are scalable to volumes of data. For example, statistics derived from a record of a session of click activity may include any of the average number of hits per second, the total number of hits, the number of distinct pages requested, the time period over which the user was active, the number of distinct IP addresses (given a session (row) of user activity (data), the number of unique IP addresses that were used if the user's IP address changed while navigating during the session), geo_country (the country of the user, which may be part of demographic information collected with the click activity data), sd_page_depth (the standard deviation of the page depth of all the pages browsed in a user session, where page depth may be derived by parsing the URL (for instance, the page depth of the URL “www.mypage.com/home/product/product-idl” is four)), d_osn (OS release of the user's device, such as Android, iOS, etc.), d_mod (model number of the user's device, such as SM-G950U, iPhone, etc.), d_ven (vendor of the user's device, such as Samsung, Apple, LG, etc.), d_hwt (hardware type of the user's device, such as Mobile Phone, Desktop, Tablet, etc.).

In further implementations, the analysis server 110 may provide discriminative features that can potentially serve to differentiate clusters among the filtered click activity data. Such discriminative features may include, for example, purchase (a Boolean value indicating whether a purchase was made in a given user session, and/or an integer value indicating the number of purchases made in the session), service (indicating whether a service is requested by the user for a given product), add-to-cart counts (indicating a number of times the user clicked on an ‘add to cart’ button while browsing products in a user session), etc.

The click activity recorded within an entity's click log data may include similar activity by different bot users, different activity by different bot users, similar activity by different human users, and different activity by different human users. The predictions generated by the machine learning model 106 may be used to support further segmentation of the human traffic and/or the bot traffic within the click log data. For example, the predictions may help to distinguish multiple activity profiles among the bot users (e.g., scrapers vs. malware bots) and/or among the human users (e.g., casual browsers vs. purchasers).

Figure 7:
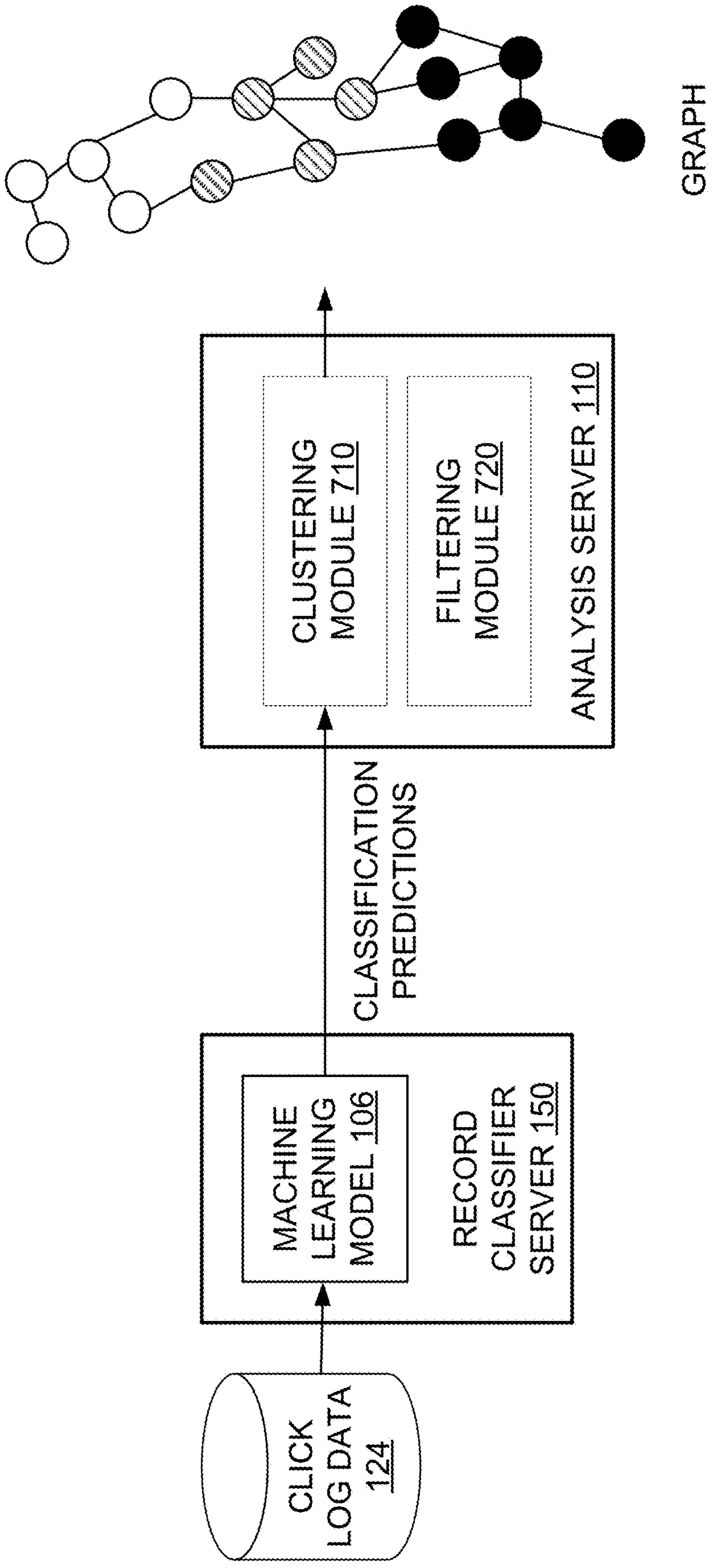
FIG. 7 depicts a block diagram of a record classifier server and an analysis server, according to certain embodiments of the present disclosure.

The dimensionality of click activity data is typically high. To facilitate further analysis of samples of click activity data as classified by the machine learning model 106, the classified samples may be projected to a lower-dimensional space (e.g., to allow for visualization of a shape or structure of the dataset as classified). In a further implementation as shown, for example, in FIG. 7, the analysis server 110 includes a clustering module 710 to provide a lower-dimensional (e.g., two- or three-dimensional) graph, based on the classification predictions, that depicts clusters of the classified samples. For example, clustering module 710 may be implemented to generate the graph by executing an implementation of the Mapper algorithm, which produces a lower-dimensional plot of the input point space as a relatively coarse graph.

Figure 8:
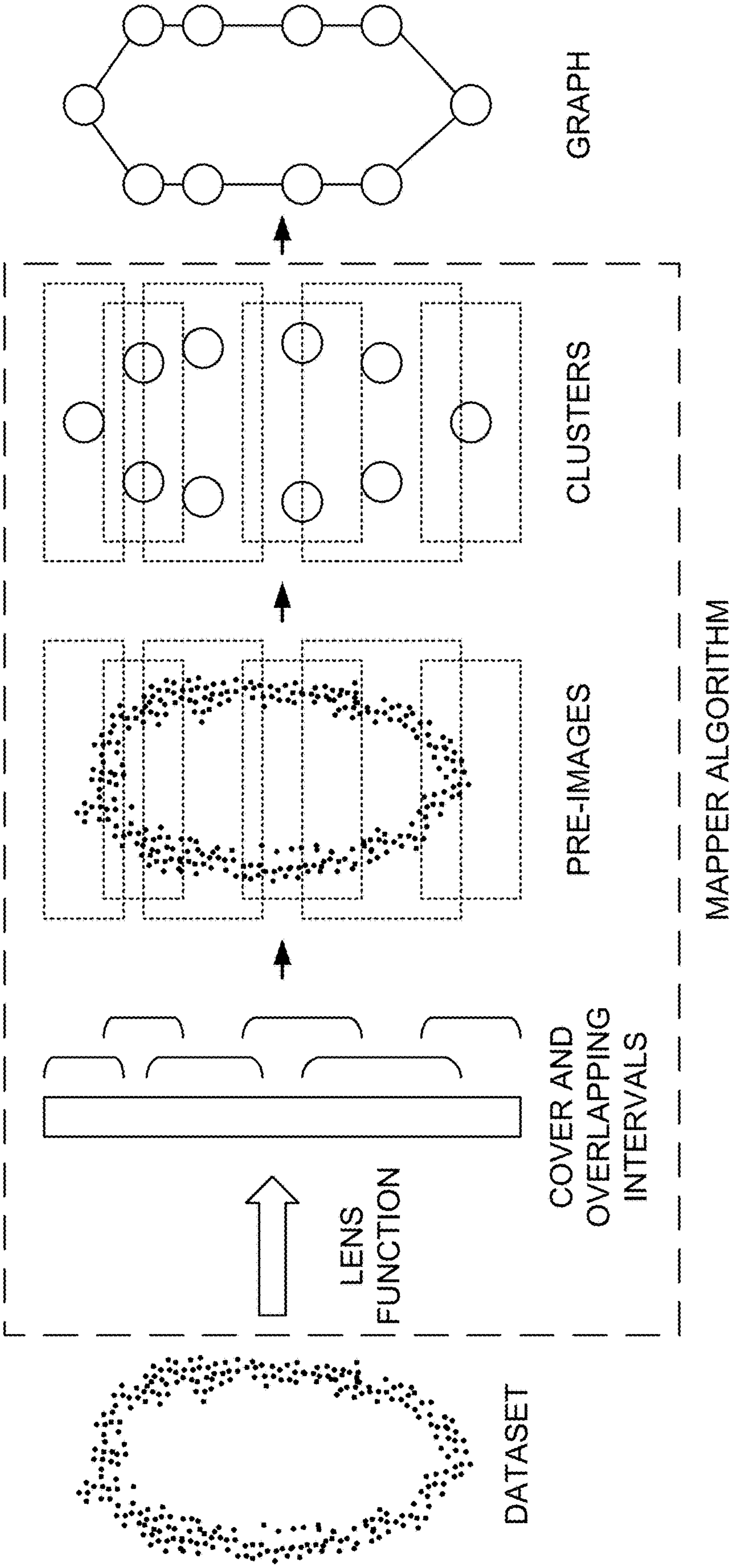
FIG. 8 depicts a generation of a graph, according to certain embodiments of the present disclosure.

As shown in FIG. 8, the Mapper algorithm includes using a lens function to project the dataset to a lower-dimensional space, constructing a cover of the projected space by generating a division of the projected space into a set of overlapping intervals, clustering the pre-images of the overlapping intervals to obtain a set of clusters (where the pre-image of an interval is the subset of the dataset that maps to the interval under the lens function), and constructing a graph whose nodes represent the clusters and whose edges represent overlap of the corresponding clusters. The lens function may be considered as providing a perspective to view the dataset. Different lens functions (which may be supervised or unsupervised) may be used to cause different views of the dataset to be surfaced in the output graph.

The lens function may be a function that maps each point in the dataset to a corresponding scalar value in the range [0, 1]. For example, the lens function may be a function that maps each point in the dataset to a corresponding probability score in the range of from 0 to 1 (denoting likelihood of a bot or human, respectively). If the classification predictions (probability of human user) are scalars in the range [0, 1], then the trained machine model 106 is already mapping each sample to a scalar in this range, and it is possible to use these predictions directly in the Mapper algorithm as the projected space (e.g., instead of training another model to generate the lens function). However, such an approach may be inadequate for the purpose of cross-domain analysis (e.g., if the machine learning model 106 is trained for each domain separately).

Alternatively, the clustering module 710 may generate the lens function by training a separate model ("auxiliary model") to build a common model that can generalize over multiple domains and output a domain-independent score for the lens function. The clustering module 710 may generate the lens function by training an auxiliary model on labels generated from predictions of the machine learning model 106 to construct a supervised lens function that maps each point in the dataset to a corresponding scalar value in the range [0, 1]. For example, the clustering module 710 may construct the supervised lens function by using labels from the classification predictions generated by the machine learning model 106 as ground truth to train the auxiliary model.

Figure 9:
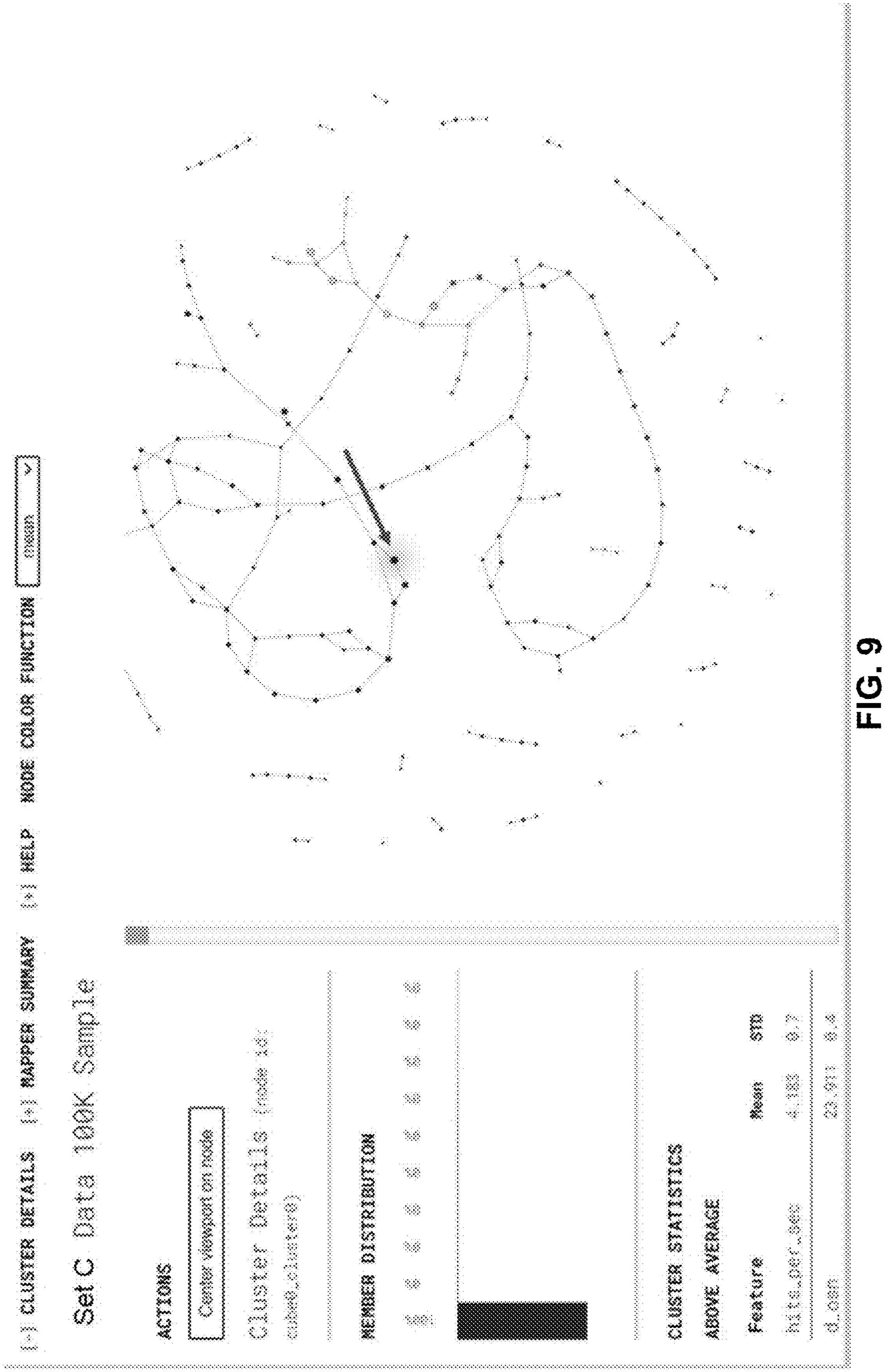
FIGS. 9 and 10 depict visualization plots for a sample of a dataset, according to certain embodiments of the present disclosure.
Figure 10:
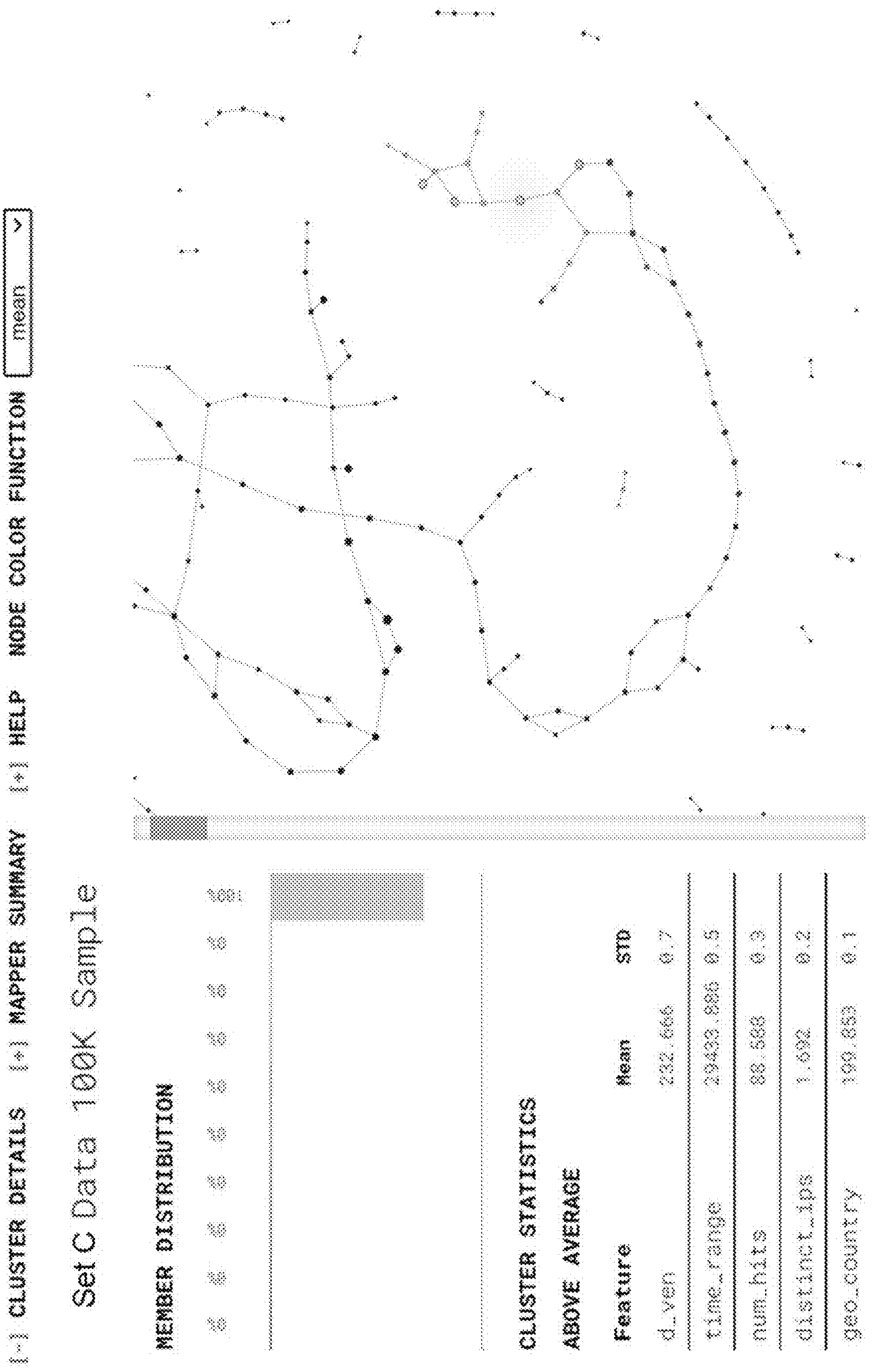

A visualization as described above (e.g., with reference to FIG. 8) can provide insights about features of data in various regions of the projected space that are useful to characterize bot traffic (e.g., by providing filtering criteria for bot detection techniques). FIG. 9 shows an example of a visualization plot for a portion (100 k samples) of dataset C (telecommunications). Each point is a node of the graph that represents a cluster of related user sessions. In this plot, purple points represent predicted bot users and yellow points represent predicted human users. A transition from traffic of bots to traffic of human users is visible in the graph as a gradual color from purple to yellow. FIG. 10 shows another visualization plot for this dataset.

In a further example, a visualization plot is supplemented by providing a display of values for the data represented by the clusters. For example, for a selected cluster and each of one or more statistics, values of the mean and the standard deviation of the statistic over the samples represented by the cluster may be displayed. FIGS. 9 and 10 show examples of such a supplemented display of a visualization plot, in which values of statistics of a selected cluster (e.g., as indicated by the red arrow in FIG. 9) are displayed in the left pane of the dashboard. Such a display may be configured so that a user (e.g., a data analyst) may observe statistics of clusters of the samples, which may be helpful to reveal similarities or distinctions within the data, by clicking on or hovering over the corresponding nodes of the graph.

The plot in FIG. 9 shows that nodes in the purple region, which represent predicted bot activity, have a high value of hits per second (i.e., a short time range between hits). In other words, these user sessions involved rapid navigation from one page to another. The plot in FIG. 10 shows that in contrast, the time range between hits is relatively higher for nodes in the yellow region (representing predicted human traffic). Such statistics may be used to characterize features of data or to generate filtering criteria for bot traffic classification algorithms.

Figure 11:
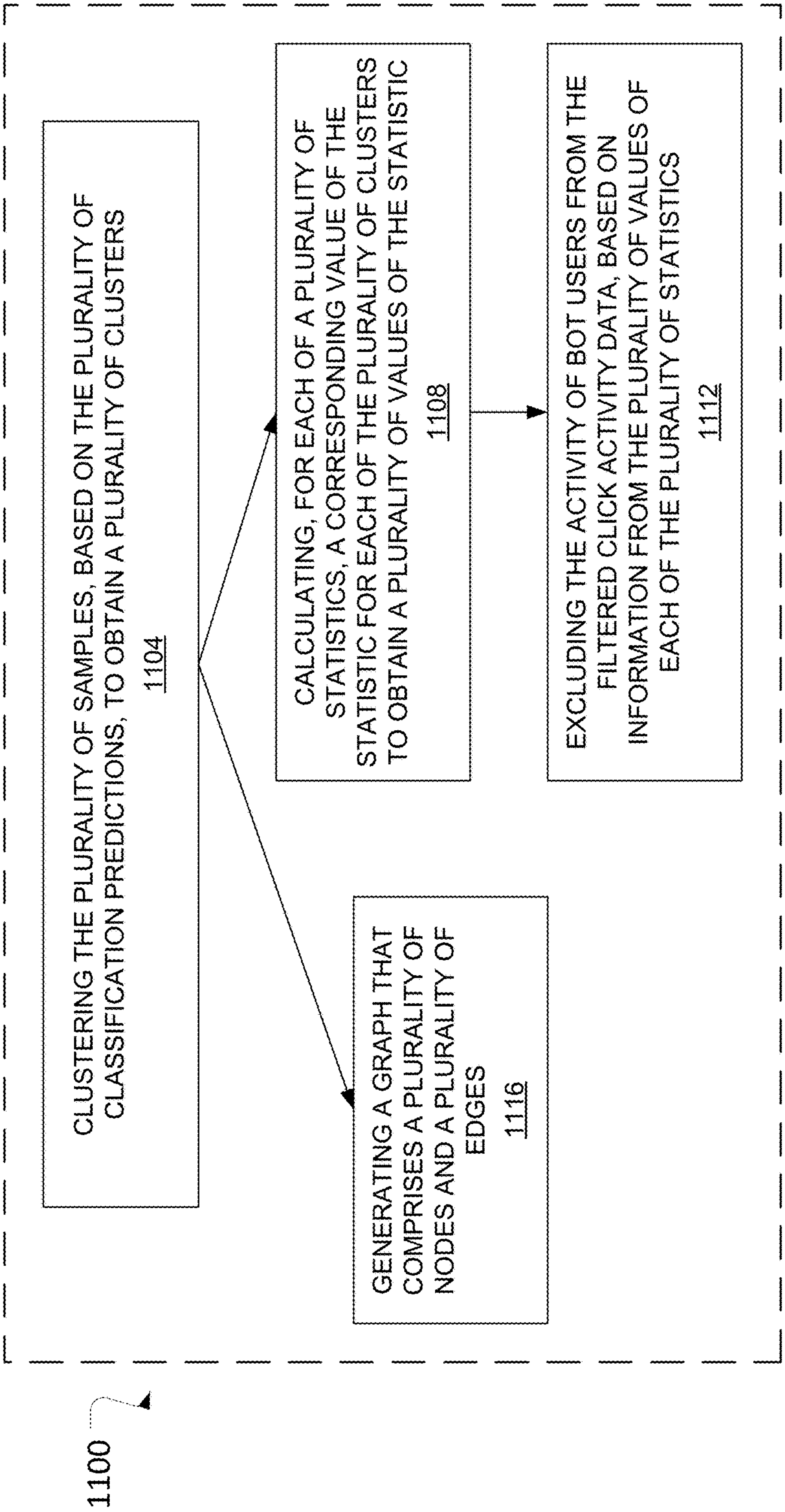
FIG. 11 depicts an implementation of a process block for filtering click activity data, according to certain embodiments of the present disclosure.
Figure 12:
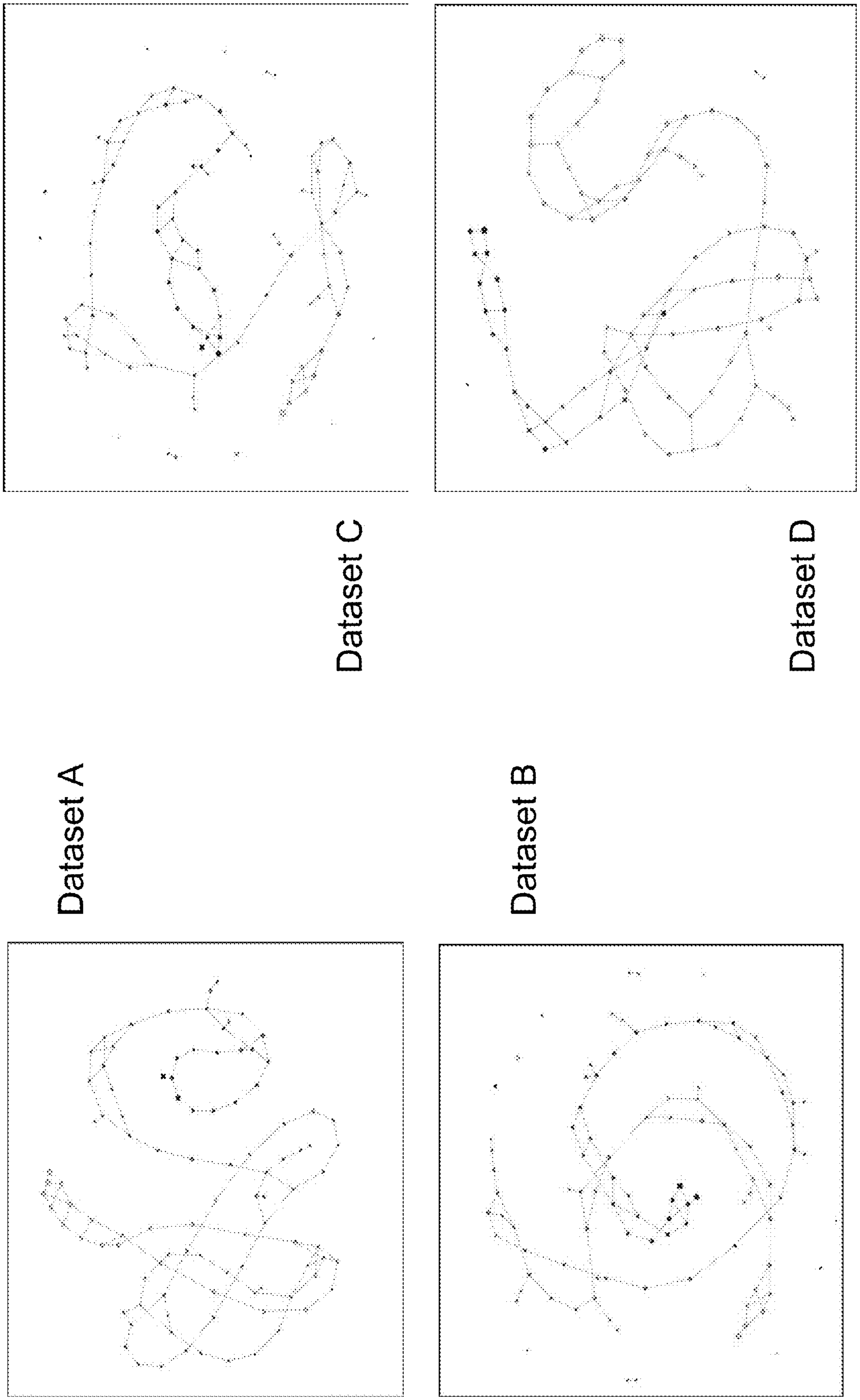
FIG. 12 depicts graphs generated from datasets, according to certain embodiments of the present disclosure.

FIG. 11 depicts an example of an implementation 1100 of block 212 for filtering click activity data (as described above with reference to FIG. 2). One or more computing devices (e.g., the analysis server 110, the bot-activity-identification computing system 140) implement operations depicted in FIG. 11 by executing suitable program code. For illustrative purposes, the implementation 1100 of block 212 is described with reference to certain examples depicted in the figures. Other implementations, however, are possible.

At block 1104, the implementation 1100 of block 212 involves clustering, by a clustering module, the plurality of samples, based on the plurality of classification predictions, to obtain a plurality of clusters. As noted above, the plurality of samples includes records of click activity by corresponding authenticated users (e.g., humans) and records of click activity by corresponding unauthenticated users (e.g., humans and bots). For example, the plurality of samples may include records of sessions of click activity by corresponding users.

At block 1108, the implementation 1100 of block 212 involves calculating, by the clustering module and for each of a plurality of statistics, a corresponding value of the statistic for each of the plurality of clusters to obtain a plurality of values of the statistic. The plurality of statistics may include any one or more of, for example, the average number of hits per second, the total number of hits, the number of distinct pages requested, or the time period over which the user was active.

At block 1112, the implementation 1100 of block 212 involves excluding, by a filtering module, the activity of bot users from the filtered click activity data, based on information from the plurality of values of each of the plurality of statistics. For example, samples of the click activity data which have an average number of hits per second that is above a first threshold may be excluded from the filtered click activity data. In one example, the clustering module is configured to generate at least one filtering criterion (e.g., exclude samples of the click activity data which have an average number of hits per second that is above a first threshold), based on the information from the plurality of classification predictions, and the filtering module is configured to exclude the activity of bot users from the filtered click activity data, based on the at least one filtering criterion.

At block 1116, the implementation 1100 of block 212 involves generating, by the clustering module, a graph that comprises a plurality of nodes and a plurality of edges. In an example as described above with reference to FIG. 8, each of the plurality of nodes corresponds to one of the plurality of clusters, and each of the plurality of edges connects a pair of the plurality of nodes that corresponds to a pair among the plurality of clusters that share samples of the plurality of classified samples.

The training server 104 may train the machine learning model 106 using click log data from multiple different business entities. As noted above, for example, the click log data 124 may include samples collected from unrelated communication channels, such as from websites and/or other communication channels of multiple different entities. Training the machine learning model 106 on positive training data 120 and negative training data 122 that have been obtained from different entities may produce a generalized (e.g., domain-invariant) model that may be more robust to noise, for example. A generalized model may also help to overcome a cold start problem for a business entity having a limited amount of click log data for training.

In a similar manner, a lens function for generating visualization plots as described above may be constructed using samples of web log data from multiple different entities. FIGS. 12A-12D show examples of visualization plots that were generated by applying such a lens function individually to each of four of the collected datasets A, B, C, and D. In this case, the common lens function was obtained by training the auxiliary model on equal portions of data that were randomly sampled from each of the four datasets. Such a functionality can help to identify similarities of data across the various domains and may uncover more generalized insights about the web traffic logs across different industry domains. For example, segmentation of users which are relatively closer may provide useful insights. In one such example, the graph is segmented into collections of nodes, where each collection includes a corresponding reference node (a node corresponding to an authenticated user) and the nodes (corresponding to users) which are not more than a specified number (e.g., ten) of hops (nodes) away from it. Differences among the shapes and structures as depicted in such plots may also be used for cross-domain analysis.

Example of a Computing System for Implementing Certain Embodiments

Figure 13:
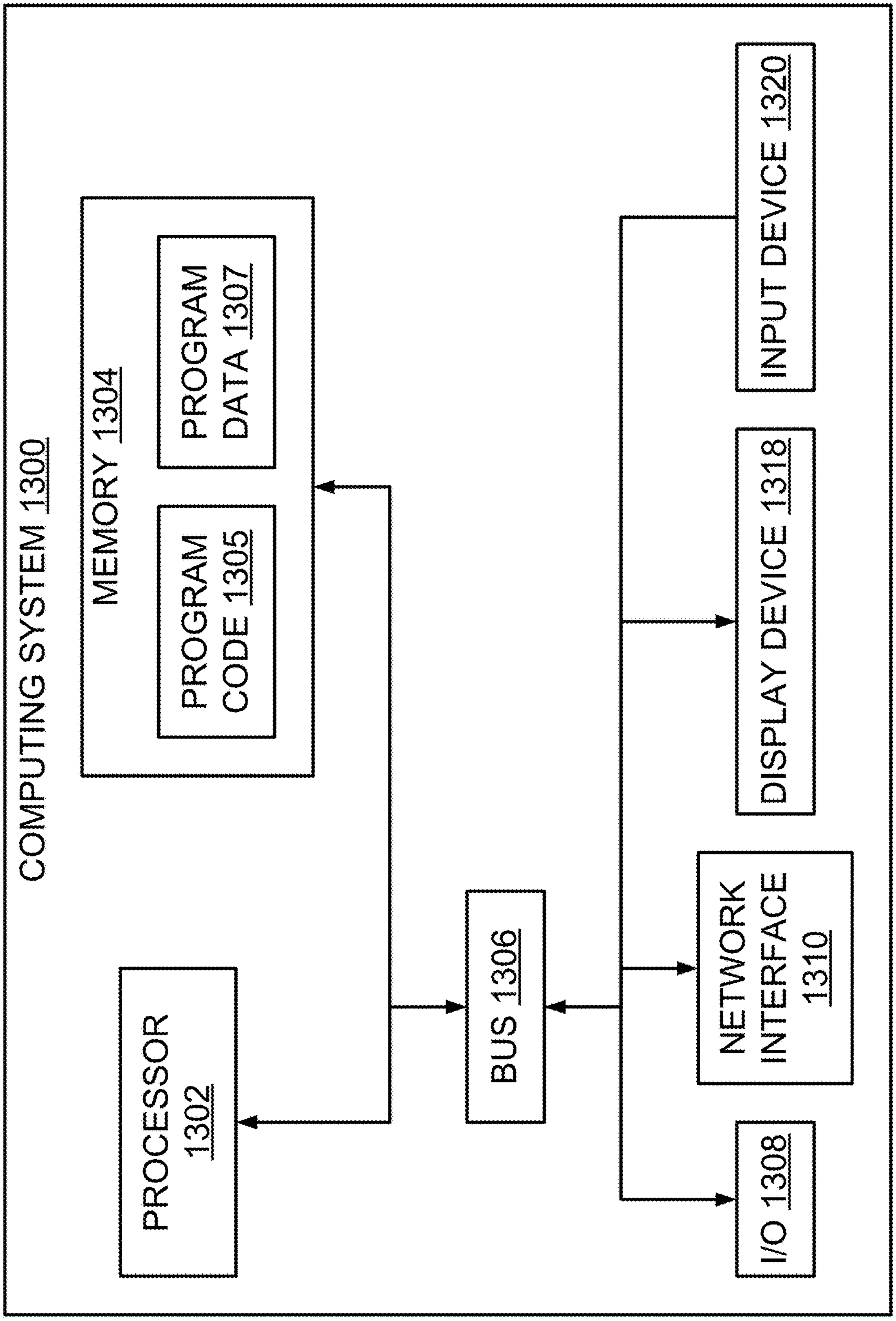
FIG. 13 depicts an example of a computing system for implementing certain embodiments of the present disclosure.

Any suitable computing system or group of computing systems can be used for performing the operations described herein. Although the training data selection server 116, the training server 104, the record classification server 150, the analysis server 110, and the interface-modification server 112 are described as different servers, the functions of these servers may be implemented using any number of machines, including one (e.g., may be implemented using one or more machines). For example, FIG. 13 depicts an example of the computing system 1300. The implementation of computing system 1300 could be used to implement a training data selection server 116, a training server 104, a record classification server 150, an analysis server 110, or an interface-modification server 112. In other embodiments, a single computing system 1300 having devices similar to those depicted in FIG. 13 (e.g., a processor, a memory, etc.) combines the one or more operations and data stores depicted as separate systems in FIG. 1.

The depicted example of a computing system 1300 includes a processor 1302 communicatively coupled to one or more memory devices 1304. The processor 1302 executes computer-executable program code stored in a memory device 1304, accesses information stored in the memory device 1304, or both. Examples of the processor 1302 include a microprocessor, an application-specific integrated circuit ("ASIC"), a field-programmable gate array ("FPGA"), or any other suitable processing device. The processor 1302 can include any number of processing devices, including a single processing device.

A memory device 1304 includes any suitable non-transitory computer-readable medium for storing program code 1305, program data 1307, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 1300 executes program code 1305 that configures the processor 1302 to perform one or more of the operations described herein. Examples of the program code 1305 include, in various embodiments, the application executed by the training data selection server 116 to train the classifier model 114, the application executed by the training server 104 to train the machine learning model 106, the application executed by the record classifier server 150 to classify samples of the click log data 124, the application executed by the analysis server 110 to filter the click activity data, the application executed by the interface-modification server 112 to modify the user interface of the computing environment, or other suitable applications that perform one or more operations described herein. The program code may be resident in the memory device 1304 or any suitable computer-readable medium and may be executed by the processor 1302 or any other suitable processor.

In some embodiments, one or more memory devices 1304 stores program data 1307 that includes one or more datasets and models described herein. Examples of these datasets include interaction data, performance data, etc. In some embodiments, one or more of data sets, models, and functions are stored in the same memory device (e.g., one of the memory devices 1304). In additional or alternative embodiments, one or more of the programs, data sets, models, and functions described herein are stored in different memory devices 1304 accessible via a data network. One or more buses 1306 are also included in the computing system 1300. The buses 1306 communicatively couples one or more components of a respective one of the computing system 1300.

In some embodiments, the computing system 1300 also includes a network interface device 1310. The network interface device 1310 includes any device or group of devices suitable for establishing a wired or wireless data connection to one or more data networks. Non-limiting examples of the network interface device 1310 include an Ethernet network adapter, a modem, and/or the like. The computing system 1300 is able to communicate with one or more other computing devices (e.g., a user computing device 102) via a data network using the network interface device 1310.

The computing system 1300 may also include a number of external or internal devices, an input device 1320, a presentation device 1318, or other input or output devices. For example, the computing system 1300 is shown with one or more input/output ("I/O") interfaces 1308. An I/O interface 1308 can receive input from input devices or provide output to output devices. An input device 1320 can include any device or group of devices suitable for receiving visual, auditory, or other suitable input that controls or affects the operations of the processor 1302. Non-limiting examples of the input device 1320 include a touchscreen, a mouse, a keyboard, a microphone, a separate mobile computing device, etc. A presentation device 1318 can include any device or group of devices suitable for providing visual, auditory, or other suitable sensory output. Non-limiting examples of the presentation device 1318 include a touchscreen, a monitor, a speaker, a separate mobile computing device, etc.

Although FIG. 13 depicts the input device 1320 and the presentation device 1318 as being local to the computing device that executes the one or more applications noted above, other implementations are possible. For instance, in some embodiments, one or more of the input device 1320 and the presentation device 1318 can include a remote client-computing device that communicates with the computing system 1300 via the network interface device 1310 using one or more data networks described herein.

General Considerations

Numerous specific details are set forth herein to provide a thorough understanding of the claimed subject matter.

However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method in which one or more processing devices perform operations comprising:

accessing a mixed plurality of samples that includes labeled samples of a first class and unlabeled samples;

for each sample of the mixed plurality of samples, calculating, by a classifier model, a corresponding class probability for the sample, wherein each of the labeled samples of the mixed plurality comprises a record of click activity by a corresponding authenticated user, and each of the unlabeled samples of the mixed plurality comprises a record of click activity by a corresponding unauthenticated user;

selecting, by a sample selection module, a training set of samples of a second class by selecting each sample of the training set from among the unlabeled samples of the mixed plurality of samples according to the class probability of the sample; and training, using a topological loss function module, a machine learning model to classify samples among the first and second classes, using a training set of samples of the first class, the training set of samples of the second class, and values of a topological loss function calculated by the topological loss function module based on the training set of samples of the first class and the training set of samples of the second class, wherein the trained machine learning model is usable for classifying click activity data to identify bot activity.

2. The computer-implemented method of claim 1, wherein the topological loss function is based on a first distance between a topological signature of an input space of the first class and a topological signature of a latent space of the first class.

3. The computer-implemented method of claim 2, wherein the topological loss function includes a regularization term that is based on the first distance.

4. The computer-implemented method of claim 3, wherein the regularization term is further based on a second distance between a topological signature of an input space of the second class and a topological signature of a latent space of the second class.

5. The computer-implemented method of claim 1, wherein each sample in the training set of samples of the first class is a record of click activity by a corresponding authenticated user.

6. The computer-implemented method of claim 1, wherein each sample in the training set of samples of the first class is a record of a session of click activity by a corresponding authenticated user, and wherein each sample in the training set of samples of the second class is a record of a session of click activity by the corresponding unauthenticated user.

7. The computer-implemented method of claim 1, wherein the machine learning model is a deep neural network.

8. The computer-implemented method of claim 1, wherein the click activity data includes activity of bot users, and wherein filtering the click activity data comprises:

generating at least one filtering criterion, based on information from a plurality of classification predictions; and excluding the activity of bot users from the filtered click activity data, based on the at least one filtering criterion.

9. The computer-implemented method of claim 8, wherein the at least one filtering criterion is a threshold value for a statistic, and wherein filtering the click activity data comprises, for each of a plurality of samples of the click activity data, comparing a value of the statistic for the sample to the threshold value.

10. The computer-implemented method of claim 8, further comprising causing a user interface of a computing environment to be modified based on information from the filtered click activity data.

11. A system comprising:

one or more processing devices; and a non-transitory computer-readable medium communicatively coupled to the one or more processing devices, wherein the one or more processing devices are configured to execute the program code stored in the non-transitory computer-readable medium and thereby perform operations comprising:

receiving a plurality of samples, wherein each of the plurality of samples is a record of click activity;

classifying the plurality of samples among a first class and a second class, using a machine learning model, to produce a corresponding plurality of classification predictions, wherein the machine learning model is trained by a training process, the training process comprising:

for each sample of a mixed plurality of samples that includes labeled samples of the first class and unlabeled samples, calculating, by a classifier model, a corresponding class probability for the sample, wherein each of the labeled samples of the mixed plurality is a record of click activity by a corresponding authenticated user, and each of the unlabeled samples of the mixed plurality is a record of click activity by a corresponding unauthenticated user;

selecting, by a sample selection module, a training set of samples of a second class by selecting each sample of the training set from among the unlabeled samples of the mixed plurality of samples according to the class probability of the sample; and training, by a training module, the machine learning model to classify samples among the first and second classes, using a training set of samples of the first class, the training set of samples of the second class, and values of a topological loss function calculated based on the training set of samples of the first class and the training set of samples of the second class;

filtering click activity data, by a filtering module and based on information from the plurality of classification predictions, to produce filtered click activity data; and causing a user interface of a computing environment to be modified based on information from the filtered click activity data.

12. The system of claim 11, wherein the topological loss function includes a regularization term that is based on a first distance between a topological signature of an input space of the first class and a topological signature of a latent space of the first class, and wherein the regularization term is further based on a second distance between a topological signature of an input space of the second class and a topological signature of a latent space of the second class.

13. The system of claim 11, wherein each sample in the training set of samples of the first class is a record of a session of click activity by a corresponding authenticated user, and wherein each sample in the training set of samples of the second class is a record of a session of click activity by the corresponding unauthenticated user.

14. The system of claim 11, wherein the user interface is at least one web page of a website.

15. The system of claim 11, wherein the click activity data includes activity of bot users, and wherein the operations further comprise:

generating at least one filtering criterion, based on the information from the plurality of classification predictions, and wherein filtering the click activity data comprises excluding the activity of bot users from the filtered click activity data, based on the at least one filtering criterion.

16. The system of claim 11, wherein the operations further comprise:

clustering the plurality of samples, based on the plurality of classification predictions, to obtain a plurality of clusters; and calculating, for each of a plurality of statistics, a corresponding value of the statistic for each of the plurality of clusters to obtain a plurality of values of the statistic.

17. The system of claim 16, wherein the plurality of statistics includes at least one of number of hits and average number of hits per second.

18. The system of claim 16, wherein the operations further comprise generating a graph that comprises a plurality of nodes and a plurality of edges, wherein each of the plurality of nodes corresponds to one of the plurality of clusters, and wherein each of the plurality of edges connects a pair of the plurality of nodes that corresponds to a pair among the plurality of clusters that share samples of the plurality of classified samples.

19. The system of claim 16, wherein the click activity data includes activity of bot users, and wherein filtering the click activity data comprises excluding the activity of bot users from the filtered click activity data, based on information from the plurality of values of each of the plurality of statistics.

20. A non-transitory computer-readable medium having program code that is stored thereon, the program code executable by one or more processing devices for performing operations comprising:

receiving a plurality of samples, wherein each of the plurality of samples is a record of click activity;

processing the plurality of samples, using a machine learning model, to generate a corresponding plurality of classification predictions, each classification prediction indicating a class probability among a first class and a second class, wherein the machine learning model is trained by a training process, the training process comprising:

for each sample of a mixed plurality of samples that includes labeled samples of the first class and unlabeled samples, calculating a corresponding class probability for the sample, wherein each of the labeled samples of the mixed plurality is a record of click activity by a corresponding authenticated user, and each of the unlabeled samples of the mixed plurality is a record of click activity by a corresponding unauthenticated user;

selecting a training set of samples of a second class by selecting each sample of the training set from among the unlabeled samples of the mixed plurality of samples according to the class probability of the sample; and training the machine learning model to classify samples among the first and second classes, using a training set of samples of the first class, the training set of samples of the second class, and values of a topological loss function calculated based on the training set of samples of the first class and the training set of samples of the second class;

filtering click activity data, based on information from the plurality of classification predictions, to produce filtered click activity data; and causing a user interface of a computing environment to be modified based on information from the filtered click activity data.

* * * * *